United States Patent
Luddeneit et al.

(10) Patent No.: US 9,533,695 B2
(45) Date of Patent: Jan. 3, 2017

(54) TRANSPORT AND LOADING SYSTEM FOR RAIL-BASED VEHICLES

(71) Applicants: Michael Luddeneit, Hummelshain (DE); Wilfried Scherf, Hummelshain (DE)

(72) Inventors: Michael Luddeneit, Hummelshain (DE); Wilfried Scherf, Hummelshain (DE)

(*) Notice: Subject to any disclaimer, the term of this patent is extended or adjusted under 35 U.S.C. 154(b) by 172 days.

(21) Appl. No.: 14/613,563

(22) Filed: Feb. 4, 2015

(65) Prior Publication Data

US 2015/0217787 A1 Aug. 6, 2015

Related U.S. Application Data

(63) Continuation of application No. PCT/DE2013/100285, filed on Aug. 8, 2013.

(30) Foreign Application Priority Data

Aug. 14, 2012 (DE) ........................ 10 2012 107 455

(51) Int. Cl.
*B61D 47/00* (2006.01)
*B61D 3/20* (2006.01)

(52) U.S. Cl.
CPC ................. *B61D 47/00* (2013.01); *B61D 3/20* (2013.01)

(58) Field of Classification Search
CPC ......... B61D 47/00; B61D 23/20; B61D 3/182; B61D 45/005; B61D 47/005; B60P 1/483; B60P 1/48; B65G 67/24; B65G 67/04

(Continued)

(56) References Cited

U.S. PATENT DOCUMENTS 3,028,023 A * 4/1962 Eckersall .............. B60P 1/6427
　　　　　　　　　　　　　　　　　　　　　　　　　　　　　　　　　105/455
3,163,127 A 12/1964 Gutridge et al.
(Continued)

FOREIGN PATENT DOCUMENTS

CN　　1469826 A　　1/2004
CN　　2644254 Y　　9/2004
(Continued)

OTHER PUBLICATIONS

International Search Report from International Application No. PCT/DE2013/100285, filed Aug. 8, 2013, mailed Mar. 3, 2014.
(Continued)

*Primary Examiner* — Kaitlin Joerger
(74) *Attorney, Agent, or Firm* — Patentbar International, P.C.

(57) ABSTRACT

A transporting and loading system for rail-supported conveyances using transport vehicles outfitted with a standardized loading platform for ISO containers, particularly for machinery for inspecting and maintaining track installations, is provided. Transporting and loading rail-supported conveyances allowing rail-supported conveyances to be safely transported to places of use at any distance apart without special-purpose vehicles and to be deposited on and picked up from a track installation without external lifting gear is described. The transporting and loading system has a sandwich construction comprising two floor assemblies which conform to ISO container dimensions, an intermediate space between the floor assemblies for drive units, transmission units and control units for the automated movement of the loading and offloading unit, and rails are provided for holding and guiding the rail-supported conveyances on the sandwich construction.

17 Claims, 13 Drawing Sheets

(58) Field of Classification Search
USPC .......................................................... 414/523
See application file for complete search history.

(56) References Cited

U.S. PATENT DOCUMENTS

| | | | | |
|---|---|---|---|---|
| 3,516,368 | A * | 6/1970 | Wright | B61D 3/04 |
| | | | | 105/455 |
| 3,548,756 | A * | 12/1970 | Fujioka | B61D 47/00 |
| | | | | 105/455 |
| 6,682,294 | B2 * | 1/2004 | Carroll | B60P 1/43 |
| | | | | 14/69.5 |
| 7,690,878 | B2 * | 4/2010 | Aaron | B61D 47/00 |
| | | | | 104/137 |
| 9,050,924 | B2 * | 6/2015 | Scherf | B60P 1/483 |
| 9,248,984 | B2 * | 2/2016 | Andre | B61D 3/184 |
| 2007/0025831 | A1 * | 2/2007 | Burt | B61D 47/00 |
| | | | | 414/339 |
| 2010/0191615 | A1 | 7/2010 | Thomas | |
| 2013/0272827 | A1 * | 10/2013 | Wegmuller | B60P 1/00 |
| | | | | 414/343 |

FOREIGN PATENT DOCUMENTS

| | | | |
|---|---|---|---|
| DE | 2044422 | | 5/1972 |
| DE | 9214306 | U1 | 6/1993 |
| DE | 4429710 | A1 | 2/1996 |
| DE | 29914122 | U1 | 11/1999 |
| DE | 102004026916 | A1 | 3/2005 |
| DE | 202012012522 | U1 * | 3/2013 ............ B61D 47/00 |
| DE | 102011057043 | A1 | 6/2013 |
| JP | 48-67409 | U | 8/1973 |
| JP | 06-85164 | U | 12/1994 |
| TW | 509643 | B | 11/2002 |
| WO | 90/01007 | | 2/1990 |

OTHER PUBLICATIONS

Search Report from the Taiwanese counterpart application No. 102112664, completed Apr. 23, 2015.

* cited by examiner

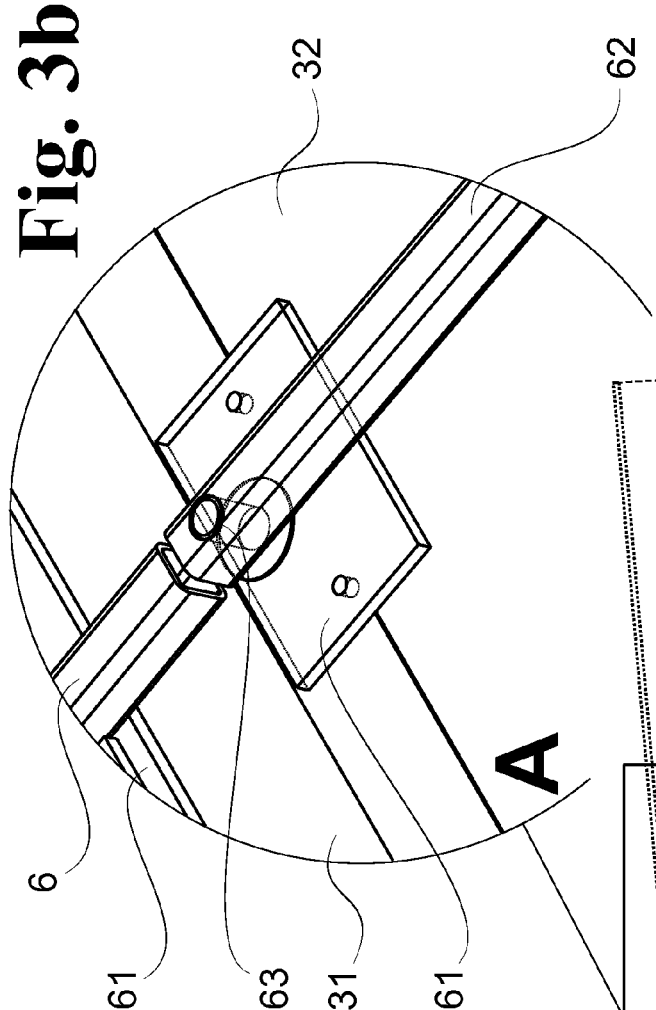
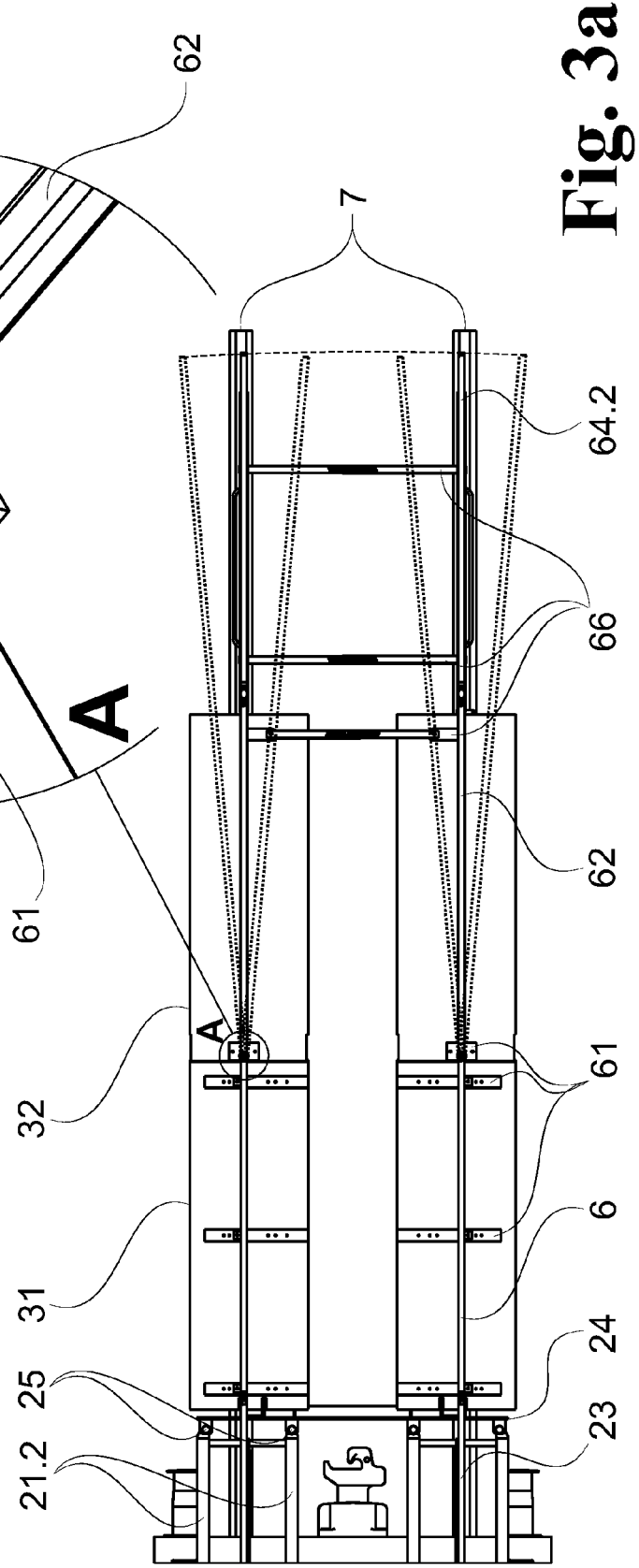

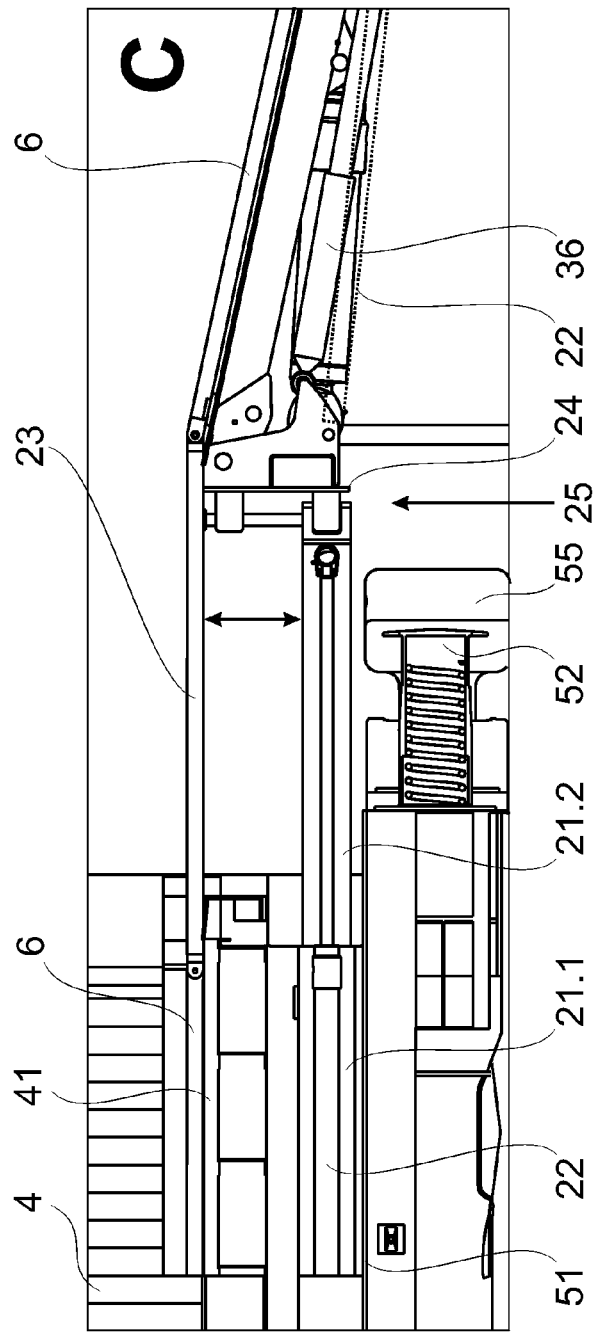
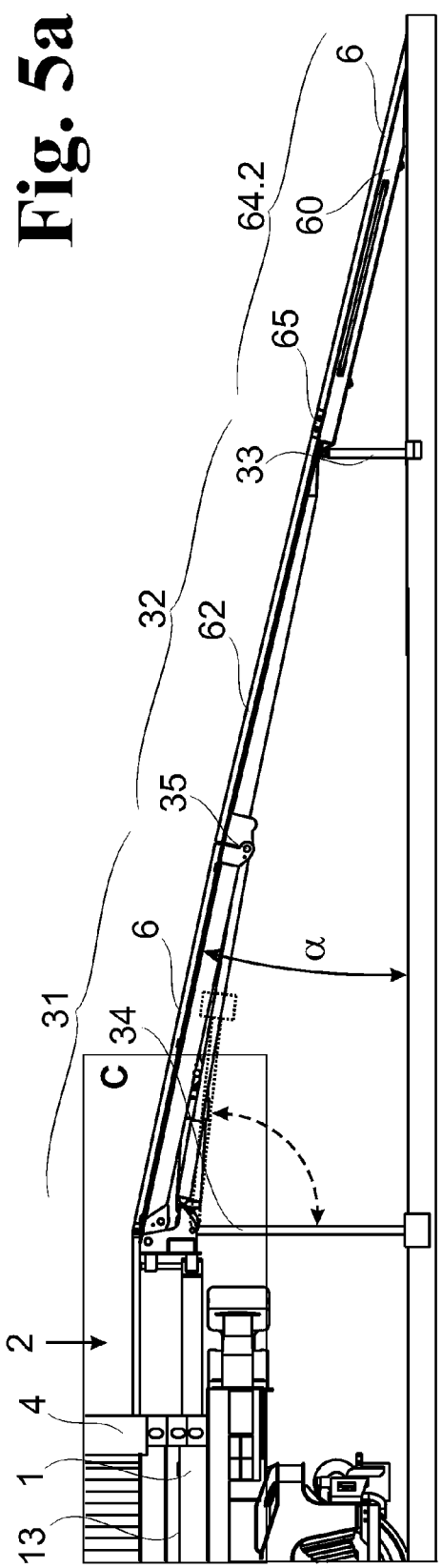

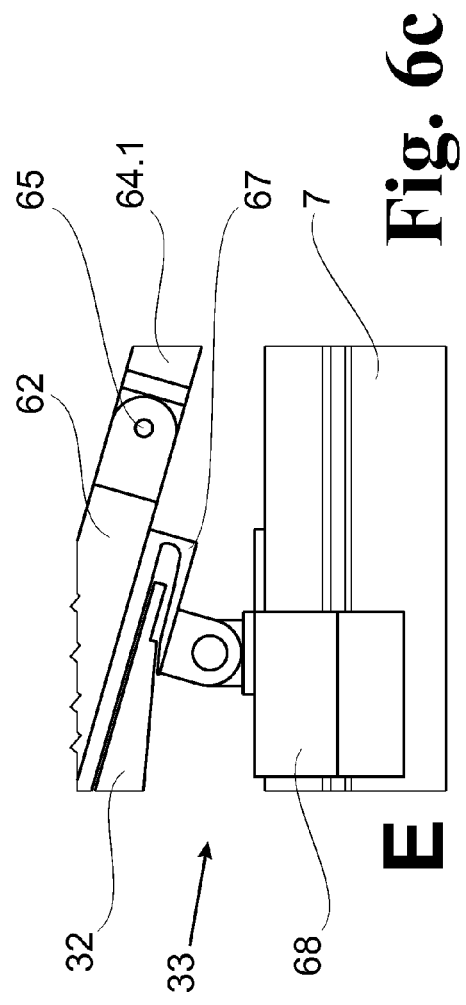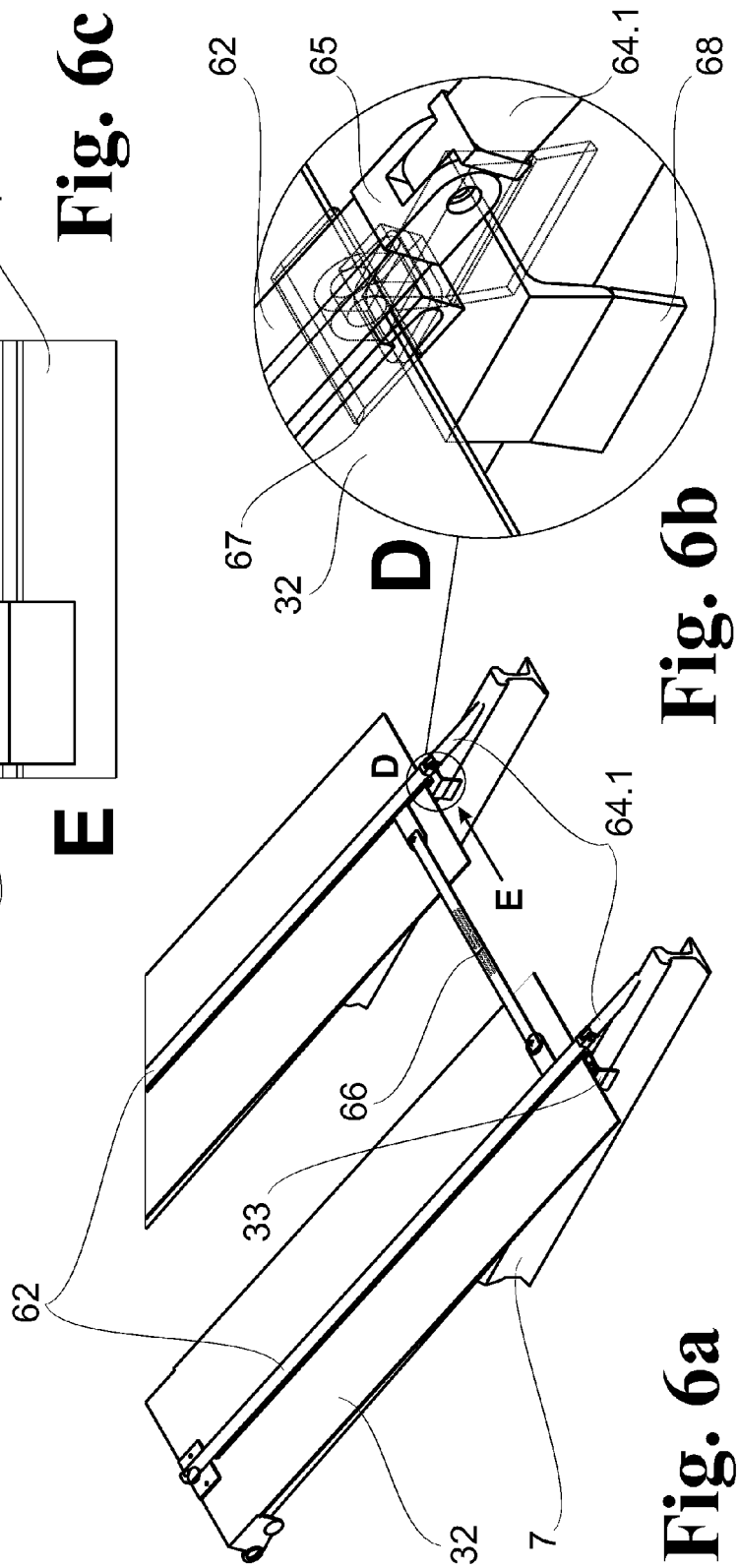

TRANSPORT AND LOADING SYSTEM FOR RAIL-BASED VEHICLES

RELATED APPLICATIONS

This application is a Continuation application of International Application PCT/DE2013/100285, filed on Aug. 8, 2013, which in turn claims priority to German Patent Applications No. Del. 10 2012 107 455.0, filed Aug. 14, 2012, both of which are incorporated herein by reference in their entirety.

FIELD OF THE INVENTION

The invention is directed to a transporting and loading system for rail-supported conveyances using transport vehicles which are outfitted with a loading platform based on standardized ISO container dimensions and with standardized lock elements. The transporting and loading system includes at least one rectangular frame in the form of a floor assembly conforming to ISO container format having two long sides and two short sides and four ISO container corners and a loading and offloading unit allowing goods to be loaded past at least one short side of the rectangular frame, particularly for transporting and loading moving machinery used for inspection and maintenance work on track installations.

BACKGROUND OF THE INVENTION

Machinery for inspecting and maintaining track installations must be transportable because it should be employed on defined sections of track as per commissions and/or authorizations at many different locations of a rail network having many branches—and possibly even in locations around the world—at short notice and therefore without any appreciable independent driving of the measuring and processing machinery itself.

In order to make the inspection and maintenance machinery transportable, either specialized track-supported special-purpose vehicles can be used which embody a combination of machines and which move under their own power, or customized carrier vehicles can be used which make possible a loading and transporting process of the inspection and maintenance machinery.

A disadvantage of systems of the kind mentioned above consists in a higher technological cost for adapting the machinery in technical respects relating to operation and work to the diverse urban rail networks, e.g., of railroads, streetcar lines or subways, and track networks which differ from country to country in case the machinery is used worldwide. Due the size of the machinery, the use of special-purpose vehicles or customized carrier vehicles is only economical if the sites where it is to be used can be reached within a reasonable delay and steps for adapting to the track width and for depositing the machinery on various track installations can be realized in a simple manner. In addition, for worldwide use there is no available standardized solution for transportation such as, for example, containers, which would minimize logistical efforts as far as possible or afford adequate protection against environmental influences if transported by sea, for example.

Therefore, there is a need for configuring inspection and maintenance machinery for track installations in the form of smaller, flexibly adaptable, modular individual units so that this inspection and maintenance machinery can be transported more easily from one place of use to the next and so that recourse may also be had to the usual methods of transport such as by truck or standardized railroad car.

One possibility for bringing track-supported inspection and maintenance machinery directly to a place of use is to transfer it to railroad cars.

A device for carrying out construction work in an area of railroad track is known in the prior art from DE 10 2004 026 916 A1. Here, the transporting of construction materials needed for the construction work is carried out by means of rail-supported work machines on a plurality of flatbed bogie cars coupled together to form a train. A contiguous section of track is mounted over the loading surfaces of the cars so that the rail-supported work machines on the cars can also move construction materials along the length of the train. The construction materials are loaded and offloaded via the front sides of the first and/or last flatcar by means of work machines which are parked either on the cars or on the track installation over which the cars travel. However, loading and offloading of the work machines is neither provided nor described.

Loading systems particularly conforming to global standards are known for transporting smaller individual units. These loading systems can be handled with the available infrastructure without additional effort and ensure a simple and immediate transfer of inspection and maintenance machinery to the place of use.

Transport units based on elements of standardized ISO containers allow an especially simple and flexible handling of general cargo that must be transported. German Utility Model DE 92 14 306 U1 discloses a transportable loading platform with a footprint conforming to the ISO containers having a loading surface which is planar and which can therefore be used in a versatile manner. Container corners are arranged at the four corners of the loading surface. Four vertically upright posts of identical length are fastened to the container corners of the loading surface, longitudinal beams being provided therebetween at the long sides of the loading surface for reinforcement. The upper ends of the posts likewise have container corners so that a plurality of loading platforms can be stacked one above the other. The container corners and the dimensions allow handling and transporting of the loading platform by any means that are also used for ISO containers. The two short sides of the platform have a flap which is hinged to the loading surface and which can be moved from a vertical to a horizontal position. In the vertical (folded up) position, the flap closes the front openings of the loading platform; in the horizontal (folded out) position, the flap can be used as an extended loading surface which is suspended at the posts at the two lateral ends of the flap by chains of appropriate length. The lengths of the flaps are selected such that a gap existing between two railroad cars can be bridged by the flaps of two successive loading platforms so as to form a usable loading bridge. When the loading platform is deposited on level ground, the flap can also be used as a drive-up ramp by folding it down to the ground. However, the transportable loading platform according to DE 92 14 306 U1 is not suitable for loading and offloading or for protected transportation of inspection and maintenance machinery. It is not possible to overcome the difference in height between the loading platform and a track so as to allow rail-supported conveyances to be deposited directly, and there is no protection against environmental influences.

SUMMARY OF THE INVENTION

The object of the invention is to find a novel possibility for transporting and loading rail-supported conveyances, particularly movable inspection and maintenance machinery, using transport vehicles outfitted with a standardized loading platform conforming to ISO container dimensions which allows rail-supported conveyances to be transported in a simple and reliable manner to places of use at any distance apart and to be transferred directly onto a track installation at a place of use or picked up again therefrom without requiring special-purpose vehicles for transport or external lifting gear for loading and offloading.

A transporting and loading system for rail-supported conveyances using transport vehicles outfitted with a loading platform based on standardized ISO container dimensions and with standardized lock elements comprises: at least one rectangular frame in the form of a floor assembly conforming to the ISO container dimensions having two long sides, two short sides and four ISO container corners; a loading and offloading unit allowing goods to be loaded past at least one short side of the at least one rectangular frame; a sandwich construction comprising in a mirror-inverted manner at least two floor assemblies conforming to the ISO container dimensions, the at least two floor assemblies each comprising one rectangular frame and a base plate are rigidly connected via the container corners pairwise arranged one directly above the other; an intermediate space provided between the at least two floor assemblies of the sandwich construction, for disposing drive units, transmission units and control units for an automated movement of the loading and offloading unit; and rails for holding and guiding the rail-supported conveyances on an upper base plate of the sandwich construction in a longitudinal direction of the at least one rectangular frame, the rails being aligned parallel to one another.

The loading and offloading unit is advantageously constructed as a linear slide-out device which is arranged in the intermediate space between the two connected floor assemblies and has at least two linear guides which can move out telescopically parallel to the long sides of the rectangular frame and include at least one linear drive which is arranged symmetrically and parallel thereto, and forms on at least one of the short sides of the two frames of the sandwich construction a supporting structure comprising upper base plate of the sandwich construction and an end plate which closes the slide-out device.

It is advantageous when the slide-out device has four linear guides and two linear drives, the linear drives being arranged in each instance between two linear guides which are arranged in pairs.

A bridge element is advisably provided for bridging an open area resulting when the slide-out device is moved out and for lengthening at least the guide for rail-supported conveyances which is produced by the rails on the base plate of the sandwich arrangement and at which the supporting structure formed of base plate and end plate is fixably arranged.

The bridge element can be constructed as a pair of rails which can move out telescopically and which are fastened to the supporting structure when the slide-out device moves out, or is formed as rail portions which can be inserted individually into grooves. Another construction of the bridge element consists in that it is constructed as a bridge plate which can be placed upon the supporting structure after the slide-out device moves out.

In what proves to be a particularly advantageous further development of the sandwich construction with a slide-out device which can move out, a collapsible ramp having a foldable ramp portion and a collapsible ramp portion is additionally fastened to the end plate of the slide-out device and can be folded out as an incline by means of which a difference in height between the base plate of the sandwich construction and the ground level on which the transport vehicle conveying the sandwich construction stands is bridged in such a way that rail-supported conveyances can be rolled on and off.

A vertically movable height adjustment means for the collapsible ramp is advantageously arranged at the end plate of the slide-out device such that a connection level of the ramp corresponding to the upper base plate of the sandwich construction can be adapted to the level of an inner floor surface of an ISO container which is placed on the sandwich construction.

The collapsible ramp advisably comprises two separate parallelly aligned track portions which are outfitted with rails and which are movable synchronously with one another and which each have a width such that they can receive the rails for the rail-supported conveyances when the latter must additionally be adapted to different track gauges.

With respect to the parallel track portions of the collapsible ramp, it has proven advantageous that swivel bearings for swivelable rail portions are arranged thereon in each instance at an upper end of the collapsible ramp portion of the ramp. The swivel bearings are arranged virtually in the center at the parallel track portions of the collapsible ramp portion so that the rail portions are swivelable laterally over the surface of the collapsible ramp portion and, when the ramp is folded out, form rail ends that can be adapted to a curve of a track installation. The swivelable rail portions advisably have rail extensions which can be folded out by a folding joint in a plane perpendicular to the track installation in order to improve the transition from the collapsible ramp portion to the rails of the track installation or to bridge a possible difference in height at a given angle of inclination of the ramp. The rail extensions can preferably be adapted in length depending upon the height difference to be overcome between the base plate of the sandwich construction, or the inner floor plate of a container placed thereon, and the ground level of the track installation for the transport vehicle.

The rail extensions advisably have ends which lie directly on the track installation and which are provided with means for guiding the rail extensions and the swivelable rail portions at the rails of the track installation. The means for guiding are preferably formed as U-shaped stops acting on both sides of the rails or as one-sided L-shaped stops arranged mirror-symmetrically with respect to one another in the track installation.

In an expanded embodiment of the sandwich construction with a collapsible ramp, it is advantageous when this collapsible ramp has foldout supports on at least one respective end of the foldable ramp portion and collapsible ramp portion. The foldout supports are preferably arranged so as to fold out at the folding joint of the ramp near the end plate of the sandwich construction and/or at the folding joint of the rail extension.

In another advantageous further development of the sandwich construction according to the invention, a telescopic boom is arranged as loading and offloading unit on the upper base plate of the sandwich construction, and the telescopic boom has two telescopic arms and two linear drives which are respectively arranged parallelly at the long sides of the rectangular frame of the sandwich construction.

This construction can preferably be further improved in that at least one part of the upper floor assembly of the sandwich construction is bearing-mounted so as to be rotatable around a perpendicular axis of rotation, wherein the rotatable portion has the telescopic boom provided as loading and offloading unit so that it is also possible for the rail-supported conveyances to be deposited to the side, e.g., on an adjacent track.

Another advisable further development of the invention is achieved in that a supporting framework as loading and offloading unit is longitudinally movably arranged on the upper base plate of the sandwich construction, and the supporting framework is movable along the long sides of the sandwich construction in guide profiles over the entire length of the sandwich construction so that the rail-supported conveyance can be set down over or picked up from the track.

To this end, a preferable embodiment is so configured that a parallelogram arrangement of linear drives connected to a depositing box for receiving the rail-supported conveyance is movably arranged at the supporting framework such that a movement to load and offload the depositing box is made up of a horizontal loading and offloading step and a vertical loading and offloading step.

A modular transporting and loading system according to the invention which is configured in a particularly advantageous manner consists in that, in an available transport vehicle with three ISO container spaces, the sandwich construction is arranged at a rear end of the loading platform of the transport vehicle, an ISO container (storage container) which is modified for receiving rail-supported conveyances is arranged in the middle of the loading platform of the transport vehicle, and an ISO container (supply container) which is modified for the supplying of the sandwich construction is arranged at a front end of the loading platform of the transport vehicle.

If only two ISO container spaces are available on a transport vehicle for the modular transporting and loading system according to the invention, the sandwich construction is placed at a rear end of the loading platform of the transport vehicle, an ISO container (storage container) which is modified for receiving rail-supported conveyances is placed on the sandwich construction, and an ISO container (supply container) which is modified for the supplying of the sandwich construction is arranged in front of the sandwich construction on the loading platform of the transport vehicle and locked.

The present invention makes it possible to realize a novel transporting and loading system for rail-supported conveyances, particularly for movable inspection and maintenance machinery for track installations, using transport vehicles outfitted with a loading platform based on standardized ISO container dimensions and with standardized lock elements by means of which the rail-supported conveyances can be transported in a simple and reliable manner to places of use at any distance apart and can be transferred directly onto a track installation at a place of use or picked up again therefrom without requiring special-purpose vehicles for transporting or external lifting gear for loading and offloading.

BRIEF DESCRIPTION OF THE DRAWINGS

The invention will be described more fully in the following with reference to embodiment examples. The accompanying drawings show:

FIG. 3a a top view of the movement area of the laterally swivelable rail portions on the collapsible ramp portion of the collapsible ramp;

FIG. 3b is a perspective view of a rail of the swivelable rail portion received at a swiveling joint;

FIG. 4b is an enlarged view of FIG. 4a;

FIG. 5a is a side view of the collapsible ramp in loading position in an upper position on the level of the floor surface of an ISO container deposited on the sandwich construction;

FIG. 5b is an enlarged view of FIG. 5a;

FIG. 6a a perspective view of the swivelable rail portion having short supports which is guided at the track by means of U-section;

FIG. 6b is a perspective detailed view of a lug engaging the end of the collapsible ramp portion and of the short support fastened to the lug;

FIG. 6c is a side view of the lug and of the short support fastened thereto with U-section;

DETAILED DESCRIPTION OF THE PREFERRED EMBODIMENTS

Figure 1:
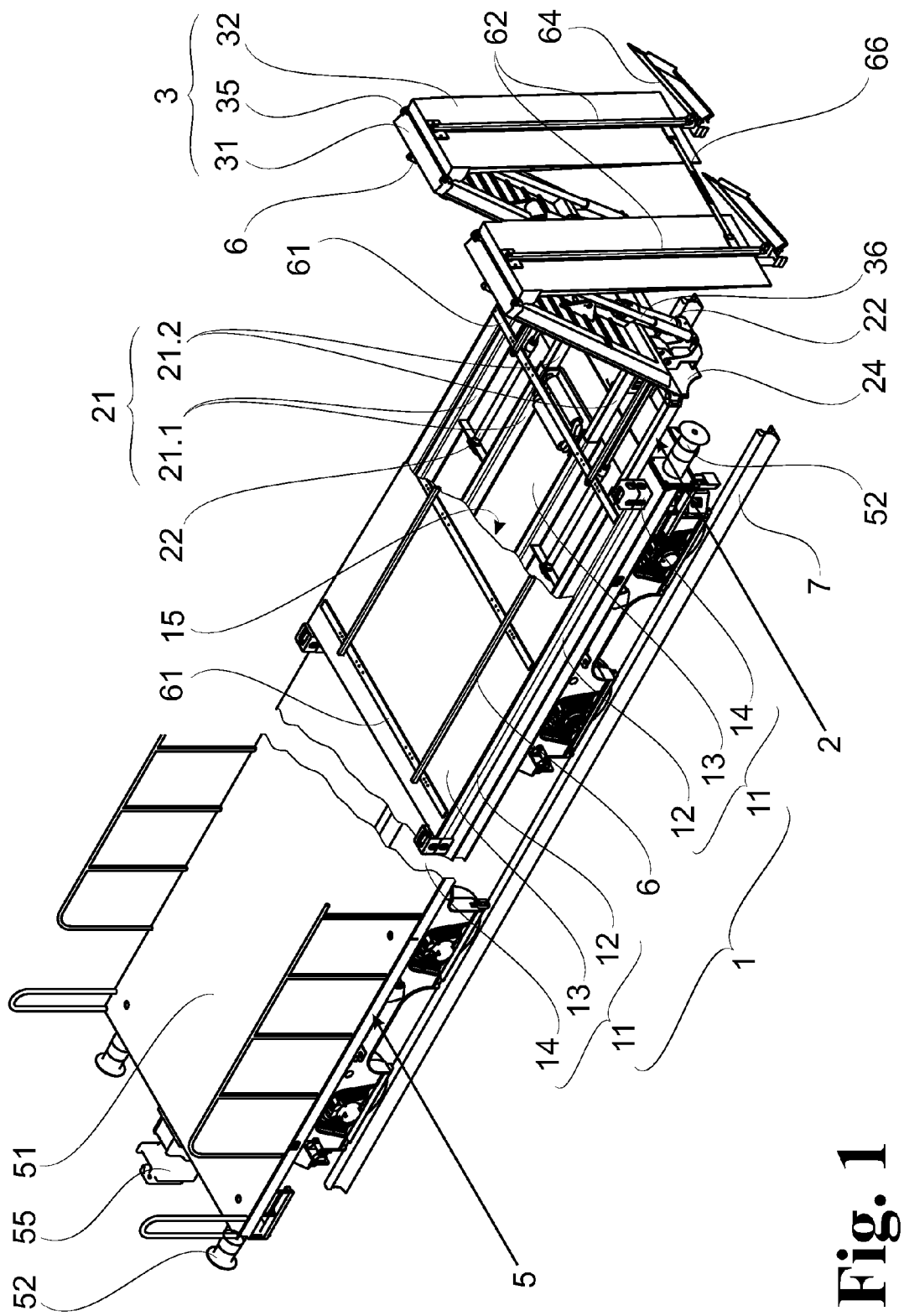
FIG. 1 is a foreshortened perspective view of a transporting and loading system, including a sandwich construction, deposited on a vehicle.

The loading and transporting system is preferably to be used for rail-supported conveyances 47, for example, work machines or measuring and inspecting equipment, which are preferably to be transported by railway and which, for this purpose, can be stowed in ISO containers 4, loaded on vehicles 5 having a loading platform 51 based on standardized ISO container dimensions, and secured by suitable lock elements 53. The rail-supported conveyances 47 should be capable of being deposited on track installations 7 or picked up from track installations 7. But the loading and transporting system can also be used on any other vehicles 5 which have a loading platform 51 of this kind and is also suitable for loading and transporting other general cargo not supported on rails. Lock elements 53 suited to this purpose, e.g., twist-lock elements, are sold by the company Jost Werke GmbH, for example.

As is shown in FIG. 1, the loading and transporting system has, as core element, a horizontally oriented sandwich construction 1 comprising at least two floor assemblies 11 conforming to the ISO format, each in the form of a rectangular frame 12 with two long sides, two short sides and a base plate 13. Each of the floor assemblies 11 has a standardized container corner 14 at the four corners. The floor assemblies 11 arranged one directly above the other are rigidly connected to one another by the container corners 14. The container corners 14 make it possible to stack the sandwich construction 1 between other transporting systems conforming to the ISO container format, between other ISO containers, or on a loading platform 51 of transport vehicles 5 suitable for transporting ISO containers and to connect it fixedly to the transport vehicle 5 or other ISO containers by means of the lock elements 53 configured for container corners 14.

In FIG. 1, the sandwich construction 1 comprises two floor assemblies 11 of 20-foot ISO containers. One floor assembly 11 is placed on another floor assembly 11 in a mirror-inverted manner so that the container corners 14 of the two floor assemblies 11 are arranged one directly above the other, and the base plate 13 of the mirror-inverted floor assembly 11, which base plate 13 was originally located on the bottom, accordingly becomes an upper side of the sandwich construction 1. By means of the rigid connection between the directly opposed container corners 14, the two floor assemblies 11 together form the sandwich construction 1. An intermediate space 15 is formed between the two connected floor assemblies 11 and is available for installing drive units, transmission units and control units of a loading and offloading unit expanding the range of functions of the sandwich construction 1. When producing the sandwich construction 1, the height of the intermediate space 15 is made possible by adapting the directly opposed container corners 14. The minimum height of the intermediate space 15 is reached when the height of the container corners 14 of a floor assembly 11 is halved. If necessary, it is also possible to increase the size of the intermediate space 15 by inserting spacers between the container corners 14.

Rails 6 are arranged on the upper base plate 13 of the sandwich construction 1 for loading and offloading rail-supported conveyances 47. Because the rails 6 rest on the base plate 13 and must at most receive the weight force of the rail-supported conveyances 47 to be transported, it is sufficient to use sections (for example, square sections or I-sections) on which the rail-supported conveyances 47 can be guided, for example, by disk wheels with wheel flanges. The level of the upper side of the rails 6 which receives the rail-supported conveyances 47 is below that of the container corners 14 belonging to the base plate 13 so that an ISO container 4 can be placed upon the sandwich construction 1 without damaging the rails 6.

The gauge of the rails 6 can be adapted depending on the track gauge of the rail-supported conveyances 47 to be transported. For purposes of adjusting the track gauge, the rails 6 are mounted by detachable screw connection on a track gauge adjustment means 61 which is fixedly connected to the base plate 13. The track gauge adjustment means 61 has a plurality of threaded holes for adjusting the track gauge. The track gauge adjustment means 61 are constructed as flatirons which are fastened orthogonal to the rails 6 in an equally spaced manner to the start, end and middle of the base plate 13.

In a first embodiment example of the sandwich construction 1, a push-out device 2 inserted as loading and offloading unit into the intermediate space 15 and allows the sandwich construction 1 to be lengthened parallel to one of the short sides in horizontal direction beyond the border of the sandwich construction 1. This embodiment, shown in FIG. 1, is conceived for the use of a railroad flatcar as the transport vehicle 5 conveying the sandwich construction 1. When the sandwich construction 1 with the slide-out device 2 at one end of the transport vehicle 5 provided with a coupling 55 and two buffers 52 is deposited on the planar loading platform 51, the slide-out device 2 can be used as an extension of the base plate 13 so that the buffers 52 and the coupling 55 of the vehicle 5 can be bridged and a connection can be made to a loading ramp located at the same height or to a further sandwich construction 1 with slide-out device 2 positioned on an opposing transport vehicle 5.

In the present example, the slide-out device 2 is formed of four linear guides 21, two linear drives 22 and an end plate 24. However, a slide-out device 2 can also be realized with only two linear guides 21 and one linear drive 22. The linear guides 21 are formed from hollow sections which are slid telescopically one inside the other and in which an inner hollow section 21.1 is slidingly and linearly guided in an outer hollow section 21.1. The outer hollow section 21.1 is fixedly connected to the sandwich construction 1 inside the intermediate space 15. In a moved-in position of the slide-out device 2, the inner hollow sections 21.2 are slid virtually completely into the outer hollow sections 21.1. When the slide-out device 2 is moved into a moved-out position, the inner hollow sections 21.2 are slid out of the outer hollow sections 21.1. The linear guides 21 terminate in common in that all of the free ends of the inner hollow sections 21.2 are connected to the vertically oriented end plate 24 arranged parallel to the short side of the sandwich construction 1.

The four linear guides 21 are arranged parallel to the long sides of the sandwich construction 1, these linear guides 21 being combined by twos to form a driven pair. The movement of the linear guides 21 is carried out by the two linear drives 22 which are arranged in the form of fluid cylinders in each instance centrally and parallelly between the linear guides 21 forming a pair. A pair of linear guides 21 is fixedly connected in each instance to one of the long sides of the sandwich construction 1. The linear drives 22 are fixedly connected in the moving direction thereof to the sandwich construction 1 on one hand and, via the inner hollow sections 21.2, to the moving end plate 24 on the other hand.

It is also possible to use linear drives 22 other than the above-described fluid cylinders. The movement of the slide-out device 2 can also be carried out by mechanical elements such as spindle drives, chain drives or cable controls in combination with an electric motor or electromagnetically operating linear motors.

The linear drives 22 are powered via a supply arrangement 48 (shown only in FIG. 10) which is to be externally connected to the sandwich construction 1. This supply arrangement 48 provides the media and operating pressures required for the operation of the fluid cylinders and the electrical energy required for the operation of the electric drives, as the case may be. A coupling point (not shown) is integrated at the end of the sandwich construction 1 opposite the slide-out device 2 for connecting the supply arrangement 48. All of the supply lines required for the operation of the sandwich construction 1 are guided outwardly to the coupling point via line connections in the form of quick connectors. Depending upon the configuration and range of functions of the sandwich construction 1, the supply lines running in the interior of the sandwich construction 1 lead from the coupling point to the linear drives 22 and other consumers. All of the drives of the sandwich constructions 1 are advantageously based on the same drive concept so that expenditure on supply means can be kept as low as possible.

In a special embodiment, the sandwich construction 1 is constructed without an expanded range of functions. A sandwich construction 1 of this kind then serves exclusively achieve an elevated depositing position for an ISO container 4 placed thereon. The sandwich construction 1 without an expanded range of functions has coupling points for the supply unit laterally at both ends of one of the long sides. The supply lines are looped through the sandwich construction 1 in the interior thereof via the two coupling points so that, for example, the supply arrangement 48 at one end of the sandwich construction 1 and, at the other end, the sandwich construction 1 with slide-out device 2 can be combined to form a modular transporting and loading system. The detachable connection lines are used as was described above for connecting between the coupling points of the adjacently deposited modules.

In the moved-in position, the end plate 24 is positioned in the immediate vicinity of the short side of the sandwich construction 1 so that the opening to the intermediate space is covered by the end plate 24. The moved-in position is only illustrated in FIG. 8.

In the moved-out position, the end plate 24 is located in a position, defined by the maximum moved-out length of the linear guides 21 and the working range of the linear drives 22, which goes beyond the boundary of the sandwich construction 1, wherein a supporting structure is formed by the edge of base plate 13 and by the end plate 24, and rail bridges 23 can be received thereon for bridging the area which would otherwise be left open between the sandwich construction 1 and the end plate 24. In an advantageous embodiment, the rail bridges 23 are already integrated in the rails 6 on the upper base plate 13 of the frame 12 and are pulled telescopically out of the rails 6 arranged on the base plate 13 when the slide-out device 2 moves into the moved-out position. However, the rail bridges 23 can also be fastened to the rails 6 of the base plate 13 such that they can be folded out manually by means of a hinge or inserted manually into grooves separately from the rails 6 of the base plate 13.

In case no rail bridges 23 are used, it is also possible to cover the open area between the sandwich construction 1 and the end plate 24 by a bridge plate (not shown) which is likewise manipulated manually.

Depending on the length and projected loading of the slide-out device 2, it is also possible to use more than or fewer than four linear guides 21 and two linear drives 22. In the simplest configuration, only two linear guides 21 arranged parallel and symmetric to the long sides of the sandwich construction 1 with an individual linear drive 22 arranged in the middle therebetween are installed. In this embodiment, it is also possible to outfit the sandwich construction 1 with a slide-out device 2 at both short sides.

A preferred option for expanding the range of functions of the sandwich construction 1 consists in additionally supplementing the slide-out device 2 by a foldout ramp 3. The ramp 3 bridges a difference in height between the base plate 13 and a ground level on which the sandwich construction 1 itself or the transport vehicle 5 transporting the sandwich construction 1 is positioned. When the railroad flatcar is used as transport vehicle 4, the ground level is formed by the track installation 7. Due to the relatively large difference in height between the sandwich construction 1 deposited on the transport vehicle 5 and the level of the track installation 7, the ramp 3 is preferably configured as a two-part collapsible ramp 3 which has a central bending joint 35 dividing the ramp 3 into a foldable ramp portion 31 and a collapsible ramp portion 32. Collapsible ramps 3 of this kind are sold, for example, by the Belgian manufacturer Dhollandia or by Royal Nooteboom Group B.V. of the Netherlands.

The collapsible ramp 3 is received with the foldable ramp portion 31 at the end plate 24 of the slide-out device 2 so as to be foldable around a horizontal axis and has a free end at the side of the collapsible ramp portion 32 connected to the bending joint 35. FIG. 1 shows the collapsible ramp 3 in an intermediate position between a completely folded-in transporting position, in which the foldable ramp portion 31 and the collapsible ramp portion 32 would be positioned parallel to one another in a perpendicular position with respect to the base plate 13, and a completely folded-out loading position in which the ramp 3 forms the connection between base plate 13 and the ground level of the track installation 7.

To carry out a combined folding and collapsing movement, the collapsible ramp 3 likewise driven by a linear drive 22 which moves the foldable ramp portion 31. By means of a mechanical arrangement formed by coupling rods 36, the drive forces of the linear drive 22 are also transmitted to the collapsible ramp portion 32 so that the latter is unfolded simultaneous with the folding movement of the foldable ramp portion 31. As in the case of the slide-out device 2, the linear drives 22 required for moving the ramp 3 are powered by the external supply unit.

Figure 2:
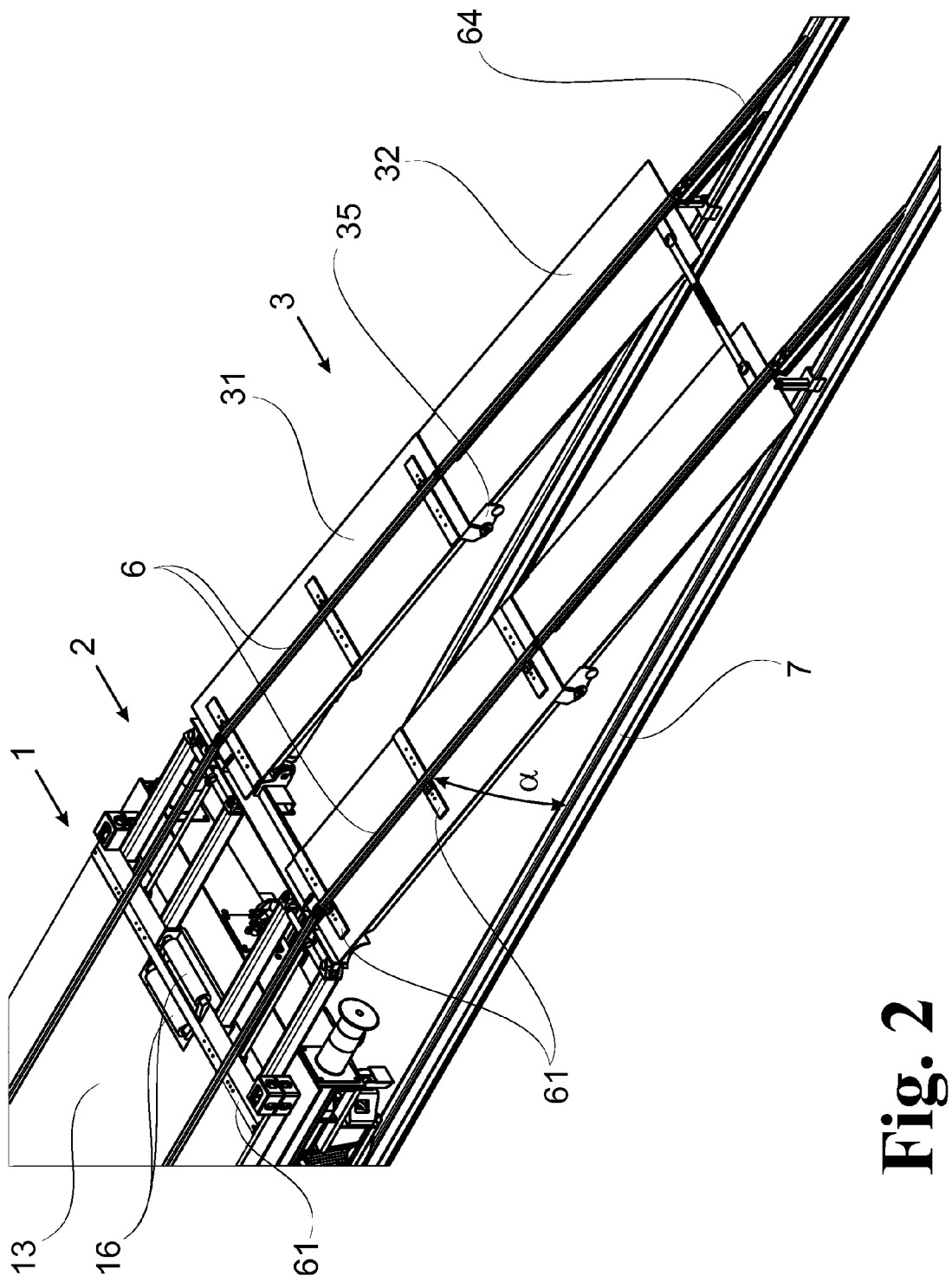
FIG. 2 a perspective view of the collapsible ramp in a loading position.

FIG. 2 shows the collapsible ramp 3 in the completely folded-out loading position in which it produces a connection between the track installation 7 and the base plate 13 of the sandwich construction 1 at a ramp angle α. Rails 6 which are divided into portions corresponding to the folding of the collapsible ramp 3 are likewise fastened to the upper surface of the ramp 3 for loading and offloading rail-supported conveyances 47.

The rails 6 are mounted on the foldable ramp portion 31 according to the same principle by which the base plate 13 is mounted on the track gauge adjustment means 61. The track gauge adjustment means 61 are fastened at equally spaced intervals to the start, end and middle of the foldable ramp portion 31 orthogonal to the rails 6.

In the region of the collapsible ramp portion 32, as is shown in FIG. 3a, the rails 6 form a swivelable rail portion 62 which is fastened to swivel bearings 63 which are oriented orthogonal to the upper surface of the ramp 3. As is shown in FIG. 3b, the swivel bearing 63 is fastened to the upper surface of the collapsible ramp portion 32 by a detachable connection in the immediate vicinity of the bending joint 35 of the ramp 3. A plurality of threaded holes are provided in the collapsible ramp portion 32 parallel to the track gauge adjustment means 61 for fastening so that the track gauge can also be adjusted in the collapsible ramp portion 32.

The swivelable rail portion 62 has no further fastenings along the upper surface of the collapsible ramp portion 32 so that it can be swiveled out laterally around the swivel bearing 63. The maximum lateral swiveling movement is such that the swivelable rail portion 62 still remains completely in the region of the upper surface of the collapsible ramp portion 32 and can be supported on the collapsible ramp portion 32 when loaded by a rail-supported conveyance 47 to be loaded or offloaded. For conforming to the track gauge in the region of the swivelable rail portion 62, the rails 6, as shown in FIGS. 1 and 2, are connected in an articulated manner to a gauge rod 66 which is adjustable to the track gauge. Accordingly, together with the gauge rod 66, the rails 6 of the swivelable rail portion 62 form a parallelogram swiveling around the swivel bearings 63.

To produce a continuous transition between the rails 6 of the swivelable rail portion 62 and the track installation 7, the rail 6 must terminate in a wedge-shaped manner. For this purpose, the rails 6 are additionally expanded by a rail extension 64 at the end of the swivelable rail portion 62. The ends of the rail extension 64 which rest on the track installation 7 have a termination which corresponds to the ramp angle α and which narrows to an acute angle. In order that the rail extension 64 does not project beyond the dimensions of the ramp 3 in the transporting position, the rail extensions 64 are connected to the ends of the swivelable rail portion 62 by means of a folding joint 65 which is oriented orthogonal to the course of the rails 6. In the transporting position, the rail extensions 64 are folded in onto the swivelable rail portion 62 and are locked and thus secured against unintentionally folding out. Because of the relatively low weight, the rail extensions 64 can be folded in or folded out manually. However, it is also possible to provide a mechanical, electrical or fluid drive or a combination thereof for this movement.

In theory, the ramp angle α of the ramp 3 in the loading position can have any value between zero (horizontal) and a maximum value whose limit is contingent upon the type of construction. Depending on the difference in height between the base plate 13 of the sandwich construction 1 and the track installation 7, it may come about that the length of the collapsible ramp 3 is not sufficient at the maximum ramp angle α to bridge the difference in height. Further, it is possible that the rail-supported conveyance 47 can only be loaded over an angle that is flatter than the maximum ramp angle α. Adaptation of the length of the ramp 3 to large differences in height or to a required flatter ramp angle α is carried out by means of the rail extensions 64. When using the transporting and loading system according to the invention, the rail extensions 64 are adapted in the cases of application described in the following.

Figure 4B:
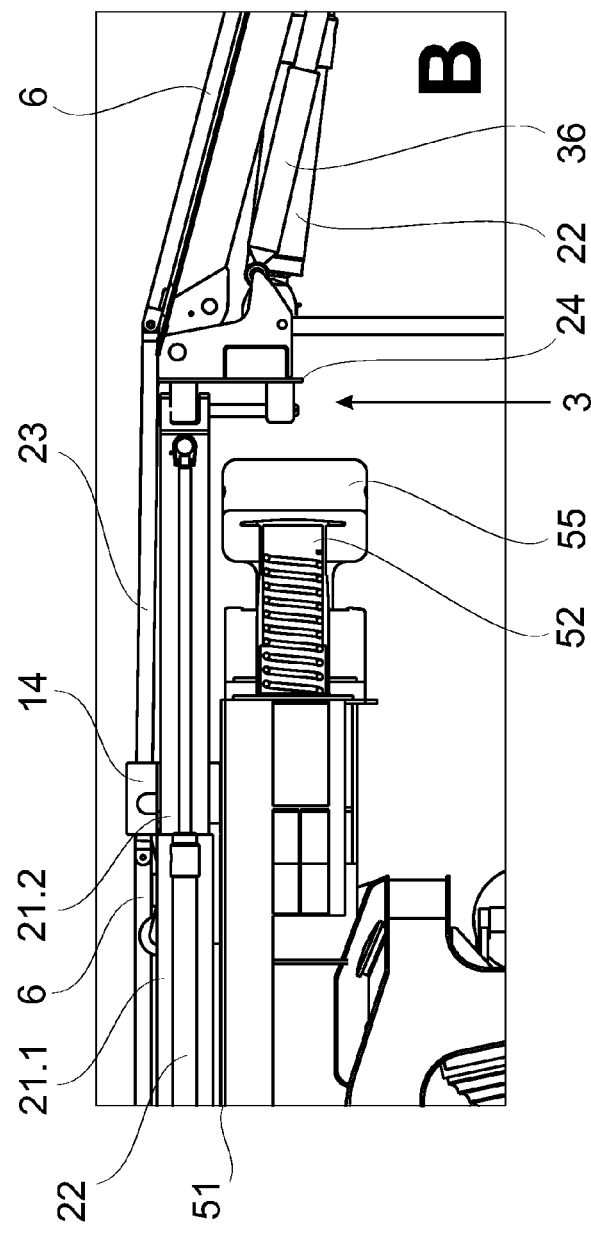
Figure 4A:
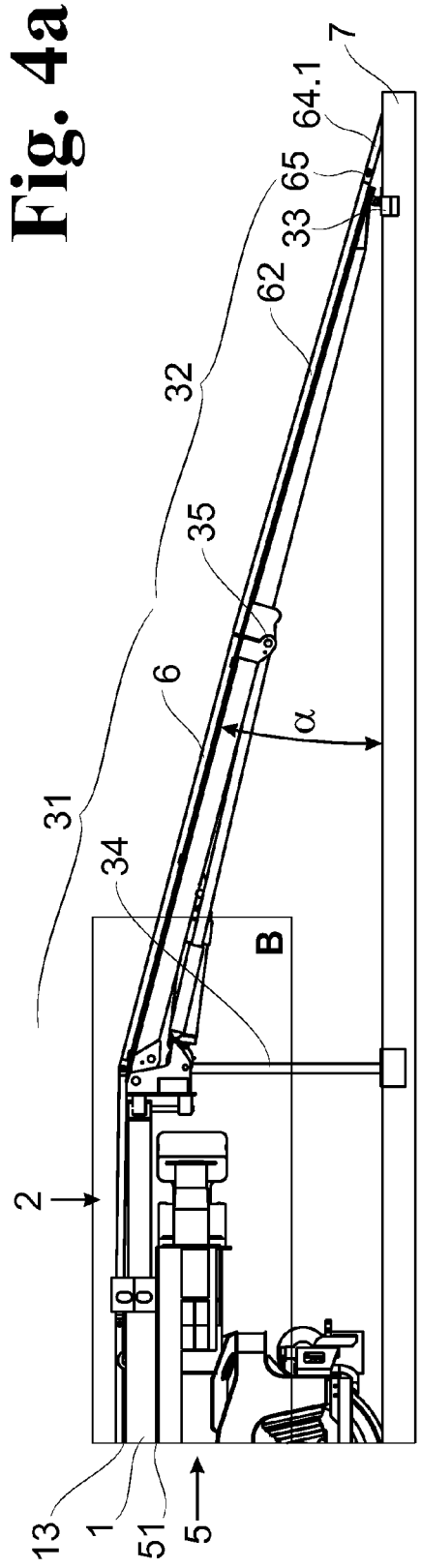
FIG. 4a is a side view of the collapsible ramp in loading position in a lower position on the level of the upper side of the sandwich construction.

In a first case of application, the sandwich construction 1 with slide-out device 2 and collapsible ramp 3 is deposited at the end of the loading platform 51 as is shown in a side view in FIG. 4*a*. The sandwich construction 1 is used in this case for loading or offloading rail-supported conveyances 47 via the front side of the transport vehicle 5. The slide-out device 2 is fully extended and the collapsible ramp 3 is in the loading position. As can be seen in the enlarged sectional view in FIG. 4*b*, the buffers 52 and the coupling 55 of the vehicle 5 are bridged by the slide-out device 2 so that the ramp 3 can be folded out without risk of damage. It can also be seen that the end plate 24 is connected to the ends of the linear guides 21 by a height adjustment means 25 which is adjustable in vertical direction. At each connection of the end plate 24 to the linear guides 21, the height adjustment means 25 has a column guide at which the end plate 24 is guided perpendicularly. A worm gear with a hand crank or an electrically operated worm drive can be used as a drive for the movement.

In FIGS. 4*a* and 4*b*, the height adjustment means 25 occupies a lower position in which the base plate 13 of the sandwich construction 1 and the unfolded ramp 3 lie at the same height level. The open area between the rails of the sandwich construction 1 and the unfolded ramp 3 which occurs when the slide-out device 2 is moved out is bridged by rail bridges 23 as was described above.

The lower position described in this case of application is the lowest that can be achieved with the height adjustment means 25. Accordingly, when ramp angle α is maintained constant, the length of the rails 6 running along the unfolded ramp 3 is also the shortest. Therefore, as is shown in FIG. 4*a*, only a short rail extension 64.1 is required for creating the continuous transition to the track installation 7.

Due to the fact that the ramp 3 which is unfolded at this ramp angle α does not itself lie on the track installation 7, a pair of short supports 33 is arranged at the underside of the free end of the collapsible ramp portion 32 by which the collapsible ramp 3 is supported on the two rails of the track installation 7. In FIG. 6*c*, the short supports 33 are shown in a sectional side view. The short supports 33 are pivotably fastened on a bearing oriented orthogonal to the direction of the track installation 7 to a lug 67 which engages the free end of the collapsible ramp portion 32 and which is fastened to both ends of the swivelable rail portion 62. Accordingly, during a movement of the collapsible ramp 3, the short supports 33 always hang perpendicularly downward due to the force of gravity. The lugs 67 produce a positively engagement with the edge of the free end of the collapsible ramp portion 32 and allow the lateral swiveling movement, illustrated in FIG. 3*a*, of the swivelable rail portion 62. As is shown in FIGS. 6*a* and 6*b*, the part of the short supports 33 seated directly on the track installation 7 is constructed as a U-section 68 which is mounted upside down on the rails of the track installation 7. The U-section 68 is used as means for guiding the swivelable rail portion 62 at the track installation 7 when the transport vehicle 5 encounters a curve in the track installation 7. FIG. 7*a* is a profile view showing the U-section 68 resting on the left-hand rail viewed in driving direction with the short support 33, the end of the swivelable rail portion 62 with the short rail extension 64.1 and the disk wheel 54 of the transport vehicle 5.

FIG. 4*b* further shows a long support 34 which is likewise arranged in pairs to support the slide-out device 2 and the ramp 3 on the track installation 7. The long supports 34 are movably fastened to the underside (which faces the track installation 7) of the end (arranged at the end plate 24) of the collapsible drive-up ramp 3 at a bearing oriented orthogonal to the course of the track installation 7 and can be folded out and folded in manually or by means of a drive unit (not shown).

In a second case of application according to FIG. 5*a*, the ISO container 4 is deposited on the sandwich construction 1. The ISO container 4 is deposited with its container corners 14 on the container corners 14 of the sandwich construction 1, and the container corners 14 are detachably connected with the lock elements 53. The ISO container 4 is preferably an ISO container 4 which is adapted for use with the transporting and loading system and is referred to hereinafter as a storage container 42 which is used for receiving the rail-supported conveyance 47. The storage container 42 is adapted in that a floor surface 41 provided in the interior of the storage container 42 is modified by the rails 6 which can be adjusted with respect to track gauge.

In FIGS. 5*a* and 5*b*, the slide-out device 2 is fully moved out and the ramp 3 is in the loading position. In order to adapt the height level of the ramp 3 to the height level of the floor surface 41 of the deposited storage container 42, the end plate 24 must be moved with the ramp 3 fastened thereto into an upper position by means of the height adjustment means 25. Rail portions are used to bridge the open area which results between the rails 6 of the storage container 42 and the unfolded ramp 3 when the slide-out device 2 is moved out.

As a result of the changed height level of the ramp 3, with the ramp angle α remaining constant, the length of the rail extension 64 must be adapted. In accordance with the displacement path of the height adjustment means 25, the amount of the extension is given by the quotient of the displacement path and the sine of the ramp angle α. Therefore, in the upper position of the height adjustment means 25 shown in FIG. 5*a*, the rail extension 64 is constructed in the form of a long rail extension 64.2. Due to the longer length, the rails 6 of the long rail extension 64.2 are no longer stable enough by themselves to receive the weight forces when loading and offloading rail-supported conveyances 47. For purposes of stabilizing, the long rail extensions 64.2 are fixedly connected to a sturdy joist 60 in the form of an I-beam which, corresponding to the long rail extension 64.2 terminating to a point, likewise has a termination which narrows in a wedge-shaped manner at ramp angle α and rests on the track installation 7. The beginning and end of the long rail extension 64.2 are connected to the joists 60 in an articulated manner by adjustable gauge rods 66 to conform to the track gauge.

Figure 7B:
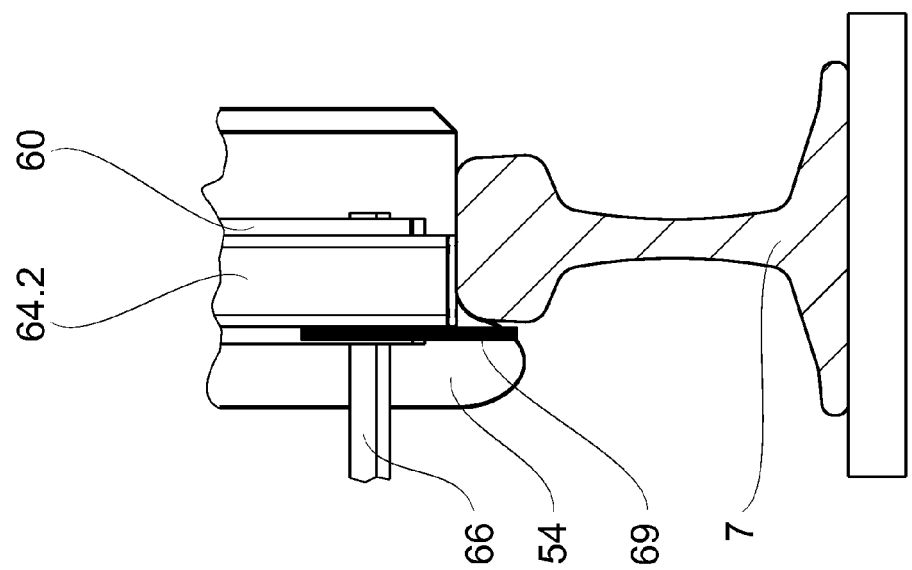
FIG. 7b is a view of a swivelable rail portion guided at the track by means of stop.
Figure 7A:
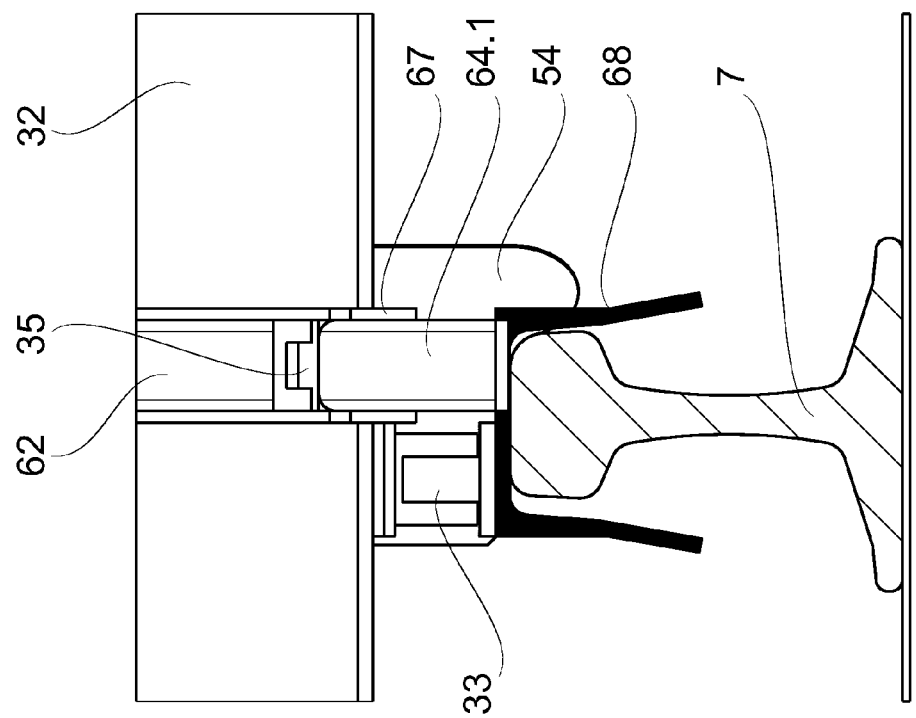
FIG. 7a is a view of a swivelable rail portion guided at the track by means of U-section.

As is illustrated in FIG. 7b in a profile view of the right-hand rail viewed in the driving direction, lateral stops 69 are fastened to the surfaces of the joists 60 contacting the track installation 7 as means for guiding the swivelable rail portion 62 with the long rail extensions 64.2 at the track installation 7 in case the transport vehicle 5 encounters a curve in the track installation 7. The stop 69 is realized by means of a plate which is fastened perpendicularly and laterally to the joist 60.

The slide-out device 2 and ramp 3 are supported on the track installation 7 by the short supports 33 and the long supports 34. Compared to the lengths of the supports 33 and 34 in the first case of application, the supports 33 and 34 in the second case of application must be lengthened by the displacement path of the height adjustment means 25. To facilitate lengthening and in case positions are also to be adjusted between the lower and upper positions of the height adjustment means 25, the short supports 33 and long supports 34 are outfitted with length adjustment means for this case of application.

FIG. 5a further shows the folding-in movement and the position of the long supports 34 occupied in the transporting position of the collapsible ramp 3. For this purpose, the long supports 34 are folded into the position indicated by a dashed line and are locked at the underside of the foldable ramp portion 31.

The upper position of the height adjustment means 25 illustrated in FIGS. 5a and 5b is the starting position which is to be occupied in order to move the slide-out device 2 from the moved-out position to the moved-in position, or vice versa. Only the upper position allows the slide-out device 2 to be completely moved in without the height adjustment means 25, end plate 24 or parts of the ramp 3 colliding with the coupling 55, the buffers 52 or the front side of the transport vehicle 5.

Figure 8:
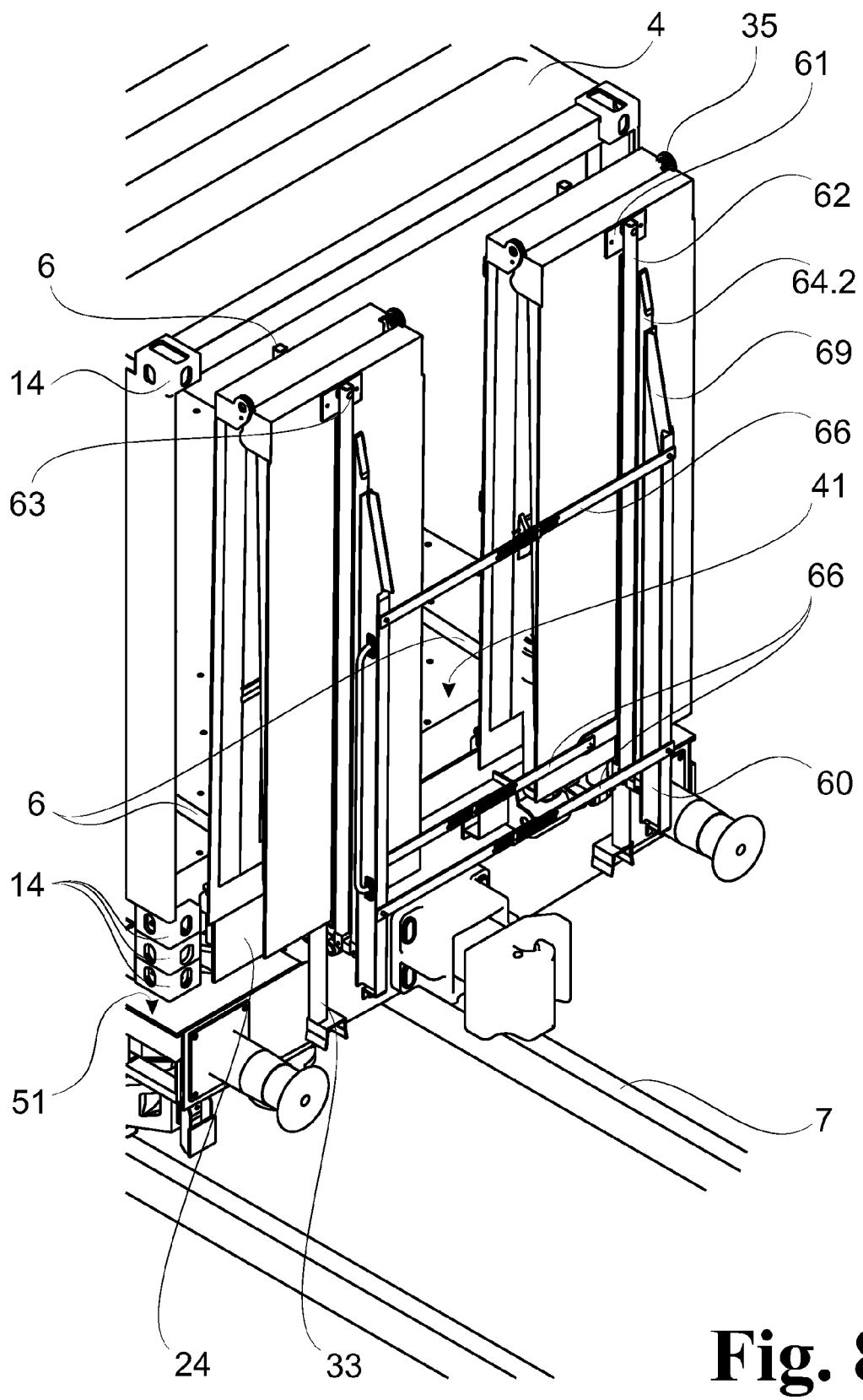
FIG. 8 is a perspective view of a transporting and loading system, including ISO container placed thereon and the collapsible ramp in a transporting position, deposited on a rail vehicle.

FIG. 8 shows the fully moved-in slide-out device 2 with the folded-in ramp 3 in the transporting position. As was described for the second case of application, the storage container 42 is deposited on the sandwich construction 1. In the transporting position, the short side of the sandwich construction 1 is completely covered by the end plate 24. The ramp 3 is located directly in front of the loading gate, not shown, of the storage container 42. It will be seen that the folded-in ramp 3 is so dimensioned that it does not project in height or width beyond the outer dimensions of the storage container 42 or any other ISO container 4 deposited on the sandwich construction 1, so that the combination of sandwich construction 1 and storage container 42 shown here can be stacked and supported without difficulty between ISO containers 4 which are located next to one another or one above the other and can be used with standardized container handling systems (for example, container loading bridges or other cranes). FIG. 8 also shows the long rail extensions 64.2 which are folded in on the swivelable rail portion 62 and locked in this position and have the two gauge rods 66 fastened the undersides of the joists 60 and stops 69.

In another embodiment of the invention, the sandwich construction 1 can also be permanently connected to a special-purpose container construction. This adaptation allows the slide-out device 2 and the ramp 3 to be fully received within the outer dimensions of the special-purpose container construction so that the transporting and loading system corresponds in length, height and width to the standardized dimensions of an ISO container 4. In this regard, the collapsible ramp 3 can be configured in such a way that it substitutes for the loading gate of the special-purpose container construction in the transporting position. It is also possible for the slide-out device 2, including ramp 3, in the transporting position to be arranged inside the special-purpose container construction so that it can be stowed behind the closed loading gates having standardized dimensions so as to be protected from damage in an optimal manner.

Figure 9:
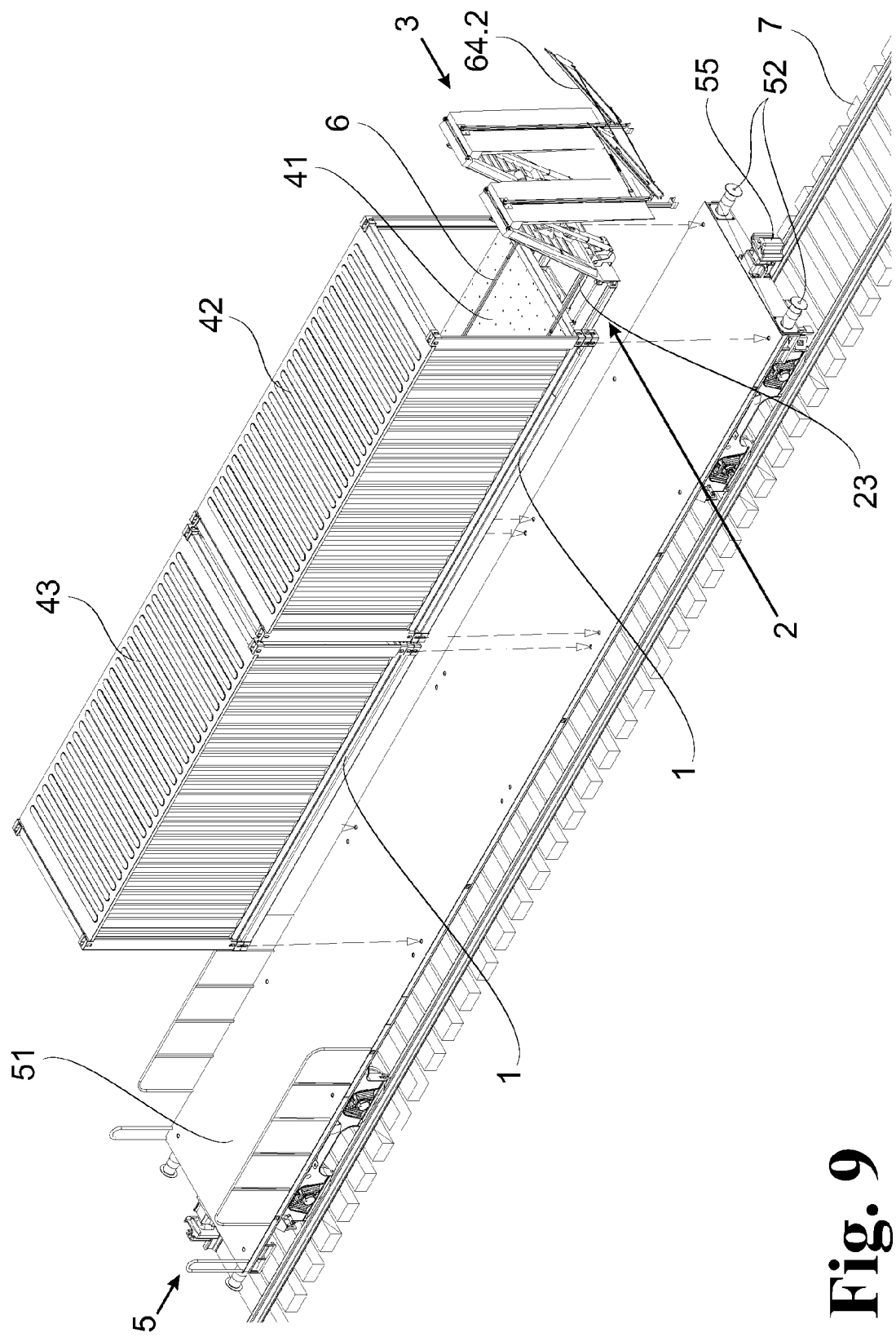
FIG. 9 is an arrangement of the sandwich construction on a vehicle with ISO containers placed thereon.

FIG. 9 shows an example of the configuration of the transporting and loading system according to the above-described second case of application of the first embodiment example. A railroad flatcar suitable for receiving and fastening three 20-foot ISO containers arranged one behind the other is used as transport vehicle 5. The sandwich construction 1 is deposited with the loading and offloading unit at the end of the loading platform 51 facing away from the driving direction of the vehicle 5 and is connected to the transport vehicle 5 by the lock elements 53. The storage container 42 is placed on the sandwich construction 1 and connected to the sandwich construction 1 by the lock elements 53. The storage container 42 preferably contains the rail-supported conveyance 47 which is to be offloaded onto the track installation 7 or picked up from the track installation 7. In view of the fact that the storage container 42 is deposited on the sandwich construction 1, the collapsible ramp 3 is in the loading position in the upper position of the height adjustment means 25. The long rail extensions 64.2 are used at the ramp 3 to compensate for the greater difference in height between floor surface 41 and the track installation 7 forming the ground level.

FIG. 9 shows a second ISO container 4 which is deposited in the middle of the loading platform 51 directly adjacent to the first ISO container 4. As with the storage container 42, this second ISO container 4 is likewise specially adapted for use with the transporting and loading system and is referred to hereinafter as a supply container 43. The supply container 43 contains the supply arrangement 48 and receives all of the units and operating means required for the self-sufficient operation of the transporting and loading system and the devices and auxiliary equipment required for maintaining the rail-supported conveyances 47.

The supply container 43 is deposited and fastened on the loading platform 51 of the transport vehicle 5 in the same manner as the storage container 42. In contrast to the storage container 42, the supply container 43 is deposited on a sandwich construction 1 which does not have an expanded range of functions and which has no loading and offloading unit, but rather only the supply lines looped through it, and which is used only to adapt to the height level of the floor surfaces 41. By adjacently depositing the supply container 43 or other ISO container 4 adjacently between the storage container 42 and the supply container 43, it is possible to join the interior space of a plurality of ISO containers 4 to form a collective usable unit. To this end, the front loading gates facing one another are constructed as roll-up gates (not shown) which can be fully retracted into the interior of the storage container 42, supply container 43 or other ISO container 4.

When the floor surface 41 of the supply container 43 or other ISO container 4 deposited between it and the storage container 42 is outfitted with rails 6 and gaps remaining between the floor surfaces 41 of adjacently deposited ISO containers 4 are bridged by short rail portions, the rail-supported conveyances 47 can also be moved through the entire interior of this ISO container 4.

The energy and operating pressures required for the self-sufficient operation of the loading and offloading unit are generated by the units (shown only in FIG. 10) of the supply container 43. Depending on the drive concept, a generator operated by internal combustion engine can be used for this purpose. This generator supplies electrical energy which is used either directly for operation of electric motors of the loading and offloading unit or indirectly for operation of units for pneumatic or hydraulic pressure generation. Fluid drives of the loading and offloading unit are then supplied by a pneumatic or hydraulic pressure system.

The linking of the supply container 43 to the sandwich construction 1 which is to be supplied or to other ISO containers 4 is carried out by means of the connection lines which are connected to the line connections of the coupling points (not shown) of the sandwich constructions 1. The supply container 43 likewise has a coupling point for connecting the connection lines to the supply container 43. As is the case on one of the long sides of the sandwich construction 1, the coupling point is incorporated in one of the side walls of the supply container 43 and makes the line connections of the supply arrangement 48 accessible from the outside. The line connections are likewise constructed in the form of quick connectors for simple and fast handling. The line connections of the supply container 43 are connected by the connection lines to the line connections of the sandwich construction 1 which is positioned under the supply container 43 and which does not have an expanded range of functions. The coupling point arranged at an end of the long side of the sandwich construction 1 is used for this purpose. The sandwich construction 1 with the loading and offloading unit is connected to the coupling point arranged at the other end of the sandwich construction 1.

Figure 10:
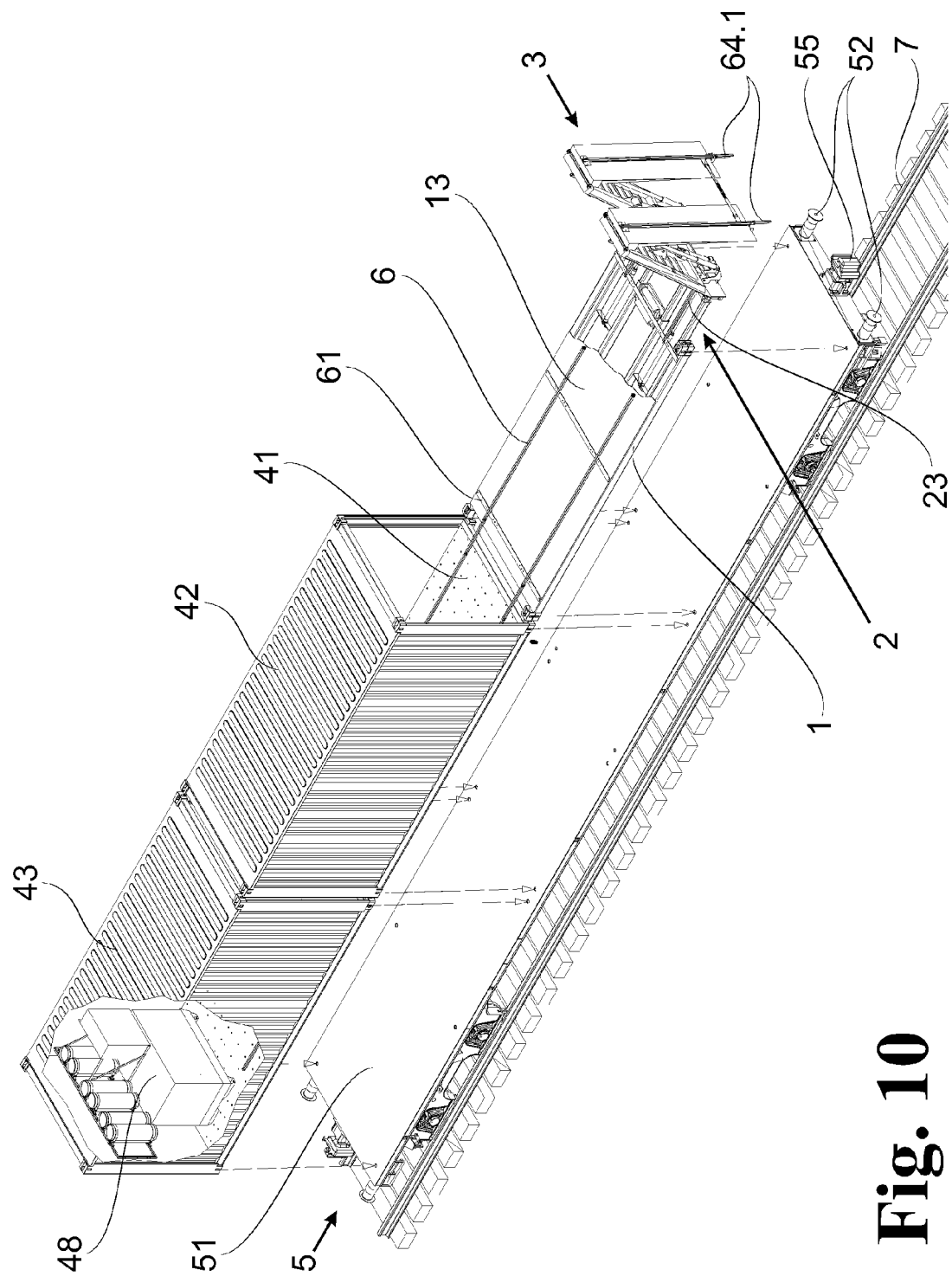
FIG. 10 is an arrangement of the sandwich construction on a vehicle with ISO containers deposited in front.

An example for the use of the transporting and loading system in the first case of application of the first embodiment example is illustrated in FIG. 10. The sandwich construction 1 outfitted with the loading and offloading unit is again deposited at the end of the loading platform 51 facing away from the driving direction of the vehicle 5 and is fastened by lock elements 53. As was already described with reference to FIGS. 3a and 3b, the storage container 42 in this case of application is deposited not on the sandwich construction 1, but directly adjacently in front of the sandwich construction 1 on the transport vehicle 5 and fastened by lock elements 53. Because the ramp 3 is in the loading position in the lower position of the height adjustment means 25, the short rail extensions 64.1 are used at the ramp 3.

Figure 11:
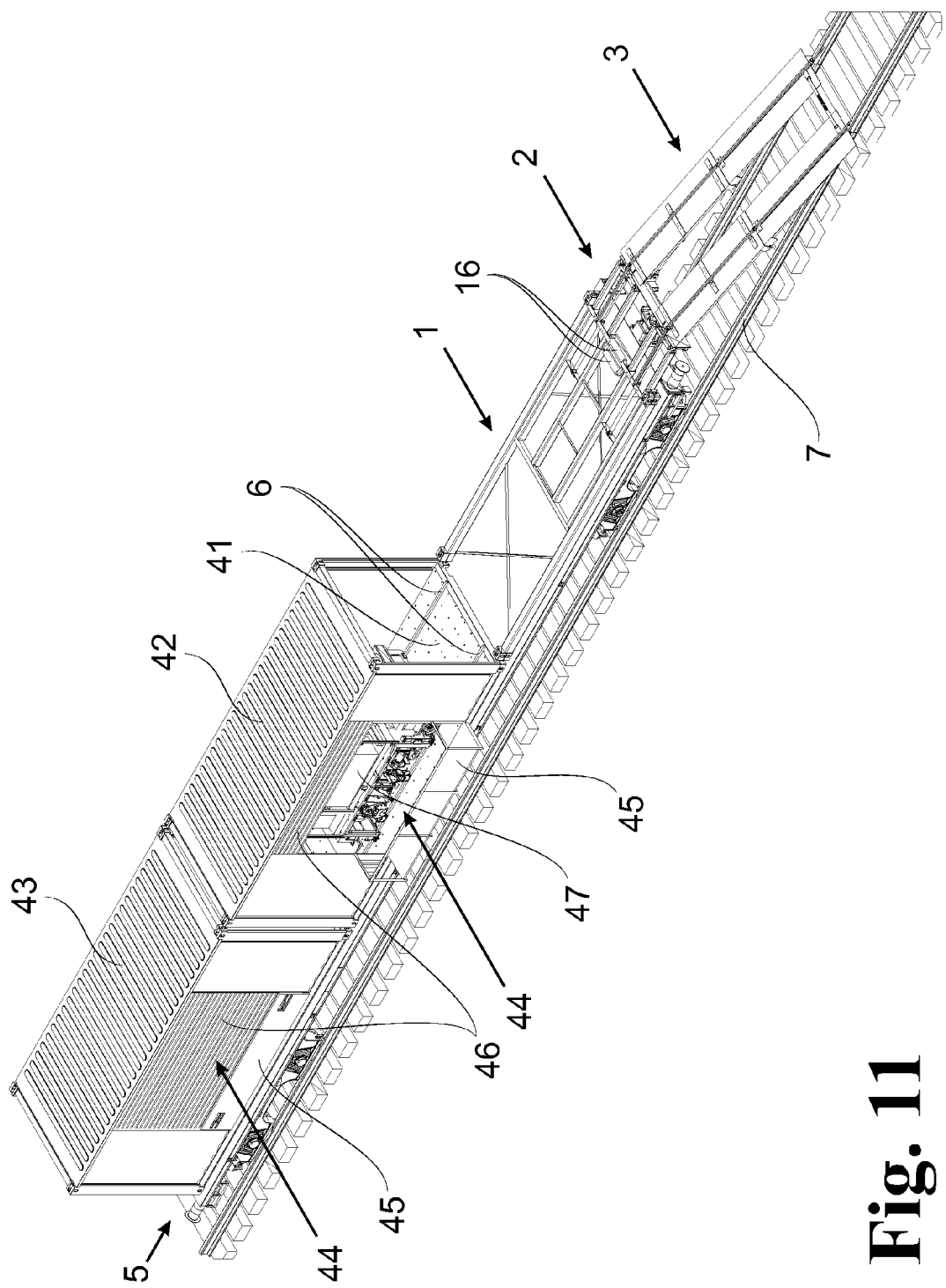
FIG. 11 is an embodiment of the ISO containers with lateral maintenance openings.

FIG. 11 shows another embodiment of the transporting and loading system in which the storage container 42 and the supply container 43 are further advantageously adapted compared to conventional ISO containers 4. In order to expand the range of functions for use with rail-supported conveyances, maintenance openings 44 were integrated in the two side walls of the ISO containers 4 next to the rails 6 arranged on the floor surface 41. For this purpose, the middle parts of the originally existing side walls of the ISO containers 4 were removed and the upper two thirds of this opening were replaced by a shutter 46. A board wall 45 which can fold out horizontally to the side is inserted into the lower third of the opening. The base of the horizontally folded-out board wall 45 forms a work platform and when folded in vertically forms a board wall which closes the lower third of the maintenance opening 44. In folded-out condition, the floor surface 41 of the storage container 42 and/or supply container 43 is expanded by the surfaces of the board wall 45 which can be folded out laterally. The board walls 45 are folded out and folded in by means of linear drives 22, preferably in the form of fluid cylinders.

The folded-out board wall 45 makes it possible to enlarge the working surface in the storage container 42 and to perform maintenance work on a rail-supported conveyance 47 deposited in the storage container 42 without having to move the rail-supported conveyance 47 out of the storage container 42 for this purpose and without having to deposit it at ground level for free access to the sides of the rail-supported conveyance 47. The folded-out board wall 45 can be provided with a handrail and projects beyond the dimensions of the storage container 42 only far enough so that maintenance work can be carried out in the storage container 42 when the board wall 45 is folded out on a straight section of track without endangering traffic on the neighboring track.

To supply the transporting and loading system, the supply container 43 is deposited on the loading platform 51 of the transport vehicle 5 in front of the storage container 42 and is fastened by lock elements 53. Aside from the units required for supplying, a rail-supported conveyance 47 can also be received on the space remaining in the supply container 43 and can be serviced through the maintenance openings 44 in the same way as described above for the storage container 42. FIG. 11 shows the opened position of the maintenance openings 44 at the storage container 42 and the closed position of the maintenance openings 44 at the supply container 43. A rail-supported conveyance 47 which visible through the maintenance openings 44 is also deposited in the storage container 42.

In both cases of application described above, loading and offloading is carried out with the driven disk wheels 54 of the rail-supported conveyance 47. In order to improve adhesion, specially adapted rails 6 (guide rails) can also be used on the ramp 3, these specially adapted rails 6 having narrowed wheel ruts in which the conical wheel flanges of the disk wheels 54 are wedged. The wheel ruts are used for guidance of and increased friction of the wheel flanges of the disk wheels 54. The wheel ruts are shaped so as to be sufficiently narrow so that the running surfaces of the disk wheels 54 of the rail-supported conveyances 47 do not rest on the upper surface of the rails 6, but rather so that the wheel flanges of the disk wheels 54 are wedged at the edges of the wheel ruts. The clamping force determined by the weight force of the rail-supported conveyance 47 leads to a considerably increased friction, which makes it possible to overcome the ramp angle $\alpha$ with the driven disk wheels 54 of the rail-supported conveyance 47.

Further, a cable winch can be provided in the supply container 43, by means of which the loading and offloading process can be assisted or performed in its entirety. With a rail-supported conveyance 47 suspended on the cable of the winch, the taught cable runs close to the ground medially along the floor surfaces 41 of an ISO container 4 or base plate 13 of the sandwich construction 1. A deflection pulley 16 is flush-mounted in the base plate 13 in the vicinity of the short side of the sandwich construction 1 provided with the ramp 3 in order deflect the cable corresponding to ramp angle α before reaching the collapsible ramp 3. The deflection pulley 16 can also be used at the end of the floor surfaces 41 of the supply container 43 or storage container 42 to deflect the cable when the containers are to be deposited and set down on (rolled onto) the sandwich construction 1 with the ramp 3.

Figure 12:
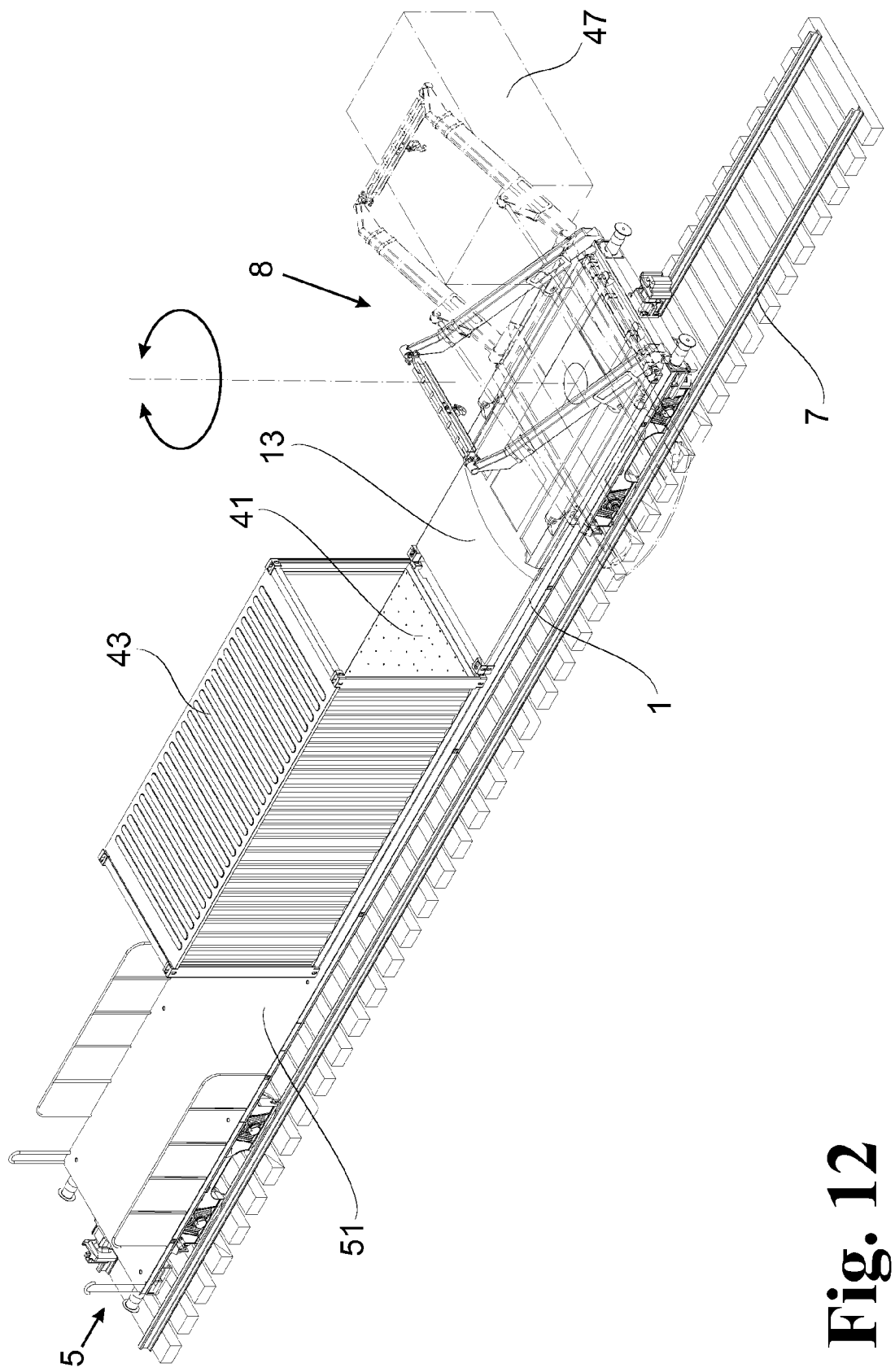
FIG. 12 is an embodiment of the sandwich construction with rotatable telescopic boom as loading and offloading unit.

In a second embodiment example of the invention, as is illustrated in FIG. 12, the loading and offloading unit of the sandwich construction 1 is realized through the use of a swivelable telescopic boom 8 which is bearing-mounted on the sandwich construction 1 so as be rotatable around a perpendicular axis of rotation. For this purpose, a portion of the floor assembly of the sandwich construction 1 forming the base plate 13 is rotatably received on a bearing so that the telescopic boom 8 can be rotated by at least ±90° around the rear of the transport vehicle 5 receiving the sandwich construction 1. To this end, the axis of rotation is arranged approximately equidistant from the long sides and from the rear short side of the sandwich construction 1. The portion of the rotatable base plate 13 is formed and driven in the same way as was described for a semitrailer in the not-previously-published patent application DE 10 2011 057 043 A1.

This rotatable telescopic boom makes it possible to deposit and pick up rail-supported conveyances 47 over the rear of the transport vehicle 5 as well as on both sides thereof (e.g., on an adjacent track). The drives, bearings and force transmitting means required for the rotational movement are received in their entirety in the intermediate space of the sandwich construction 1.

In a third embodiment example which is simplified over the second example, the loading and offloading unit of the sandwich construction 1 is likewise realized through use of the telescopic boom 8. The telescopic boom 8 is received at the end of the sandwich construction 1 facing the rear of the transport vehicle 5 on bearings which are oriented horizontal and orthogonal to the long sides so that it is swivelable between the base plate 13 and the track installation 7. Lateral telescopic arms of the telescopic boom 8 and the fluid cylinders required for the movement thereof are fastened to the long sides of the sandwich construction 1 in such a way that it is still possible to deposit an ISO container 4 on the base plate 13 of the sandwich construction 1 between the telescopic arms of the telescopic boom 8.

In addition to the above-described combinations of the transporting and loading system comprising an arrangement of a storage container 42, a supply container 43 and a sandwich construction 1 with loading and offloading unit (first case of application of the first embodiment example) and of a storage container 42, a supply container 43 and two sandwich constructions 1, one of which is not expanded to include a loading and offloading unit, there also a variety of other possible combinations in 20-foot ISO container format.

For use on railroad cars, the combination is preferably effected in such a way that all component parts of the transporting and loading system can be deposited on an individual transport vehicle 5 (flatcar). In so doing, one end of the transporting and loading system should terminate with the supply container 43 and the other end should terminate with the sandwich construction 1 with loading and offloading unit. If only two 20-foot container spaces are available, the storage container 42 can be placed on the sandwich construction 1.

However, by using two sandwich constructions 1 with a slide-out device 2 without collapsible ramp 3 which are deposited between two transport vehicles 5 with the slide-out device 2 across from the coupling point, it is also possible to use the two slide-out devices 2 to bridge the buffers 52, coupling 55 and, therefore, the distance between the two loading platforms 51, as a drive-over bridge so that any desired lengthening of the transporting and loading system is possible in theory, and a maximum embodiment is not limited to two or three spaces on a transport vehicle 5.

The minimum combination of the modular transporting and loading system comprises a supply container 43 in which the rail-supported conveyance 47 is also accommodated and which is deposited on a sandwich construction 1 with slide-out device 2 and collapsible ramp 3.

The application of the transporting and loading system is not limited to the use of 20-foot ISO containers. For example, a 40-foot ISO container can also take the place of two 20-foot ISO containers. All of the required devices can be conveniently accommodated in one 40-foot ISO container. To carry out loading and offloading processes, the 40-foot ISO container is deposited on two sandwich constructions 1; one of the sandwich constructions 1 has the loading and offloading unit with slide-out device 2 and the other sandwich construction 1 is only used for height compensation.

Figure 13:
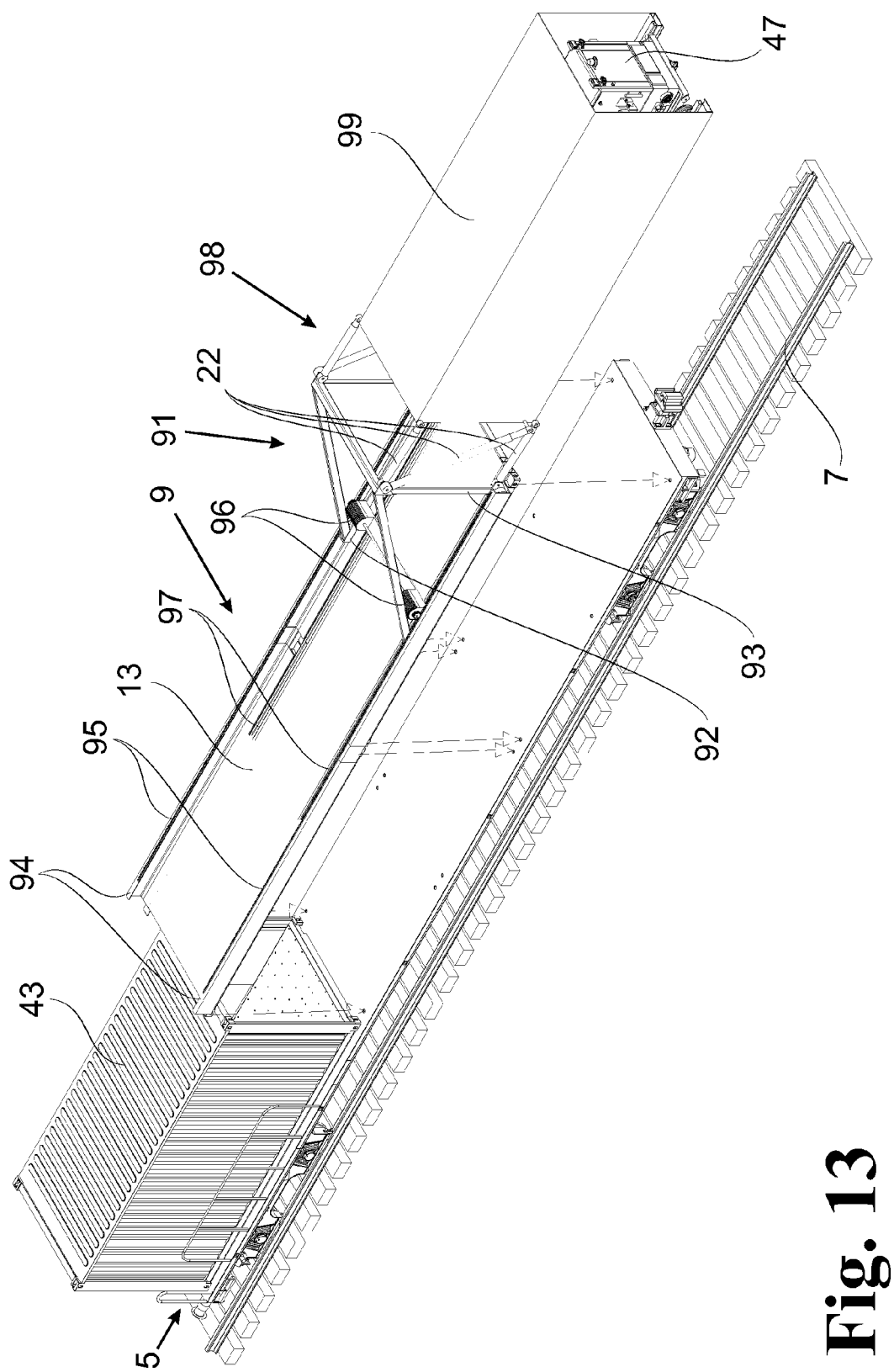
FIG. 13 is an embodiment of the sandwich construction with mobile supporting framework as loading and offloading unit.

A fourth embodiment example is shown in FIG. 13. A long sandwich construction 9 having a length which is two times longer is deposited at the end of the loading platform 51 of the transport vehicle 5 remote of the driving direction. A supply container 43 deposited on the transport vehicle 5 in front of the long sandwich construction 9 for supplying the long sandwich construction 9. Both are connected to the loading platform 51 of the vehicle 5 by lock elements 53. The long sandwich construction 9 comprises two sandwich constructions 1 in 20-foot ISO container format which are fixedly connected at the short sides and therefore has an overall length conforming to the 40-foot ISO container format. The advantage of the two connected 20-foot sandwich constructions 1 over a sandwich construction in the 40-foot ISO container format consists in that four additional container corners 14 are available in the middle of the long sandwich construction 9 for arranging lock elements 53, which improves stability under load.

The loading and offloading unit is realized in the form of a supporting framework 91 which is movable along the entire length of the long sandwich construction 9 and which is formed of a rectangular horizontal frame 92 and a virtually square vertical frame 93. The horizontal frame 92 is oriented with the long sides parallel to the long sides of the long sandwich construction 9. For moving the mobile supporting framework 91, wheels are arranged at all four corners of the horizontal frame 92 and are set upon the upper base plate 13 of the long sandwich construction 9. To guide these wheels, L-sections 94 are fastened along the entire length of the two long sides, with the short legs of the L-sections 94 directed parallel and above the base plate 13 with respect to the middle of the long sandwich construction 9. A guide path for the wheels of the mobile supporting framework 91 is formed between the upper base plate 13 and the short legs, which guide path is almost completely filled by the wheels with respect to height so that there is less play in the guide paths for the wheels.

Toothed racks 95 are fastened to the sides of the short legs of the L-sections 94 facing the guide paths. Engaging in the toothed racks 95 are pinions of drive motors 96 arranged on the horizontal frame 92 of the mobile supporting framework 91, by means of which the supporting framework 91 can be moved translationally along the long sandwich construction 9.

The vertical frame 93 is fastened on the side of the horizontal frame 92 of the mobile supporting framework 91 facing the rear end of the long sandwich construction 9. For purposes of support, a diagonally extending supporting strut is fastened in each instance between the corners of the two frames 92 and 93, which corners have not yet been connected. A parallelogram 98 which is used for the depositing movement is received in an articulated manner at the four corners of the side of the vertical frame 93 facing the rear end. The parallelogram 98 comprises four linear drives 22 of equal length received at the four corners. Two further linear drives 22 are received in an articulated manner at the upper corners of the vertical frame 93, the other ends thereof being connected to the free ends of the linear drives 22 arranged at the bottom corners.

A closed depositing box 99 is received in an articulated manner at the free ends of the linear drives 22 of the parallelogram 98, this depositing box 99 being set down from the height level of the upper base plate 13 of the long sandwich construction 9 on the track installation 7 by the movement of the parallelogram 98 or picked up from the track installation 7 in reverse direction. The depositing box 99 is similar in shape to an ISO container 4, but has smaller outer dimensions than an ISO container 4 and is provided for receiving rail-supported conveyances 47. The underside of the depositing box 99 is formed by two stable longitudinal beams which are arranged parallel to one another at the side walls running along the length of the depositing box 99. The rail-supported conveyances 47 are inserted into the depositing box 99 on these longitudinal beams so that the disk wheels 54 of the rail-supported conveyances 47 hang out downwardly and can be set down on the track installation 7. On the underside of the longitudinal beams, the depositing box 99 has rollers by which it can move on the upper base plate 13 of the long sandwich construction 9. U-section rails 97 in which the rollers of the depositing box 99 are guided are fastened to the long sandwich construction 9 on the base plate 13 for movement of the depositing box 99 in a straight line.

When a depositing box 99 is deposited on the long sandwich construction 9, the mobile supporting framework 91 is located at the end of the long sandwich construction 9 oriented in driving direction. The closed depositing box 99 is located entirely in the region of the long sandwich construction 9 and is set down on the base plate 13 by the rollers. In this transporting position, the linear drives 22 of the parallelogram 98 are relieved of load. For loading or offloading, the depositing box 99 is raised slightly by the linear drives 22 and the mobile supporting framework 91 moves to the rear end of the long sandwich construction 9 by means of the drive motor 96 meshing with the toothed racks 95. When the mobile supporting framework 91 has arrived at the rear end, the depositing movement of the depositing box 99 past the rear end side of the vehicle 5 onto the track installation 7 is carried out by the parallelogram 98. The depositing box 99 is held by the parallelogram 98 so as to be constantly parallel to the track installation 7. The depositing movement is continued until the depositing box 99 is deposited on the ties of the track installation 7 and the linear drives 22 can be relieved of load. Shortly before reaching the depositing position of the depositing box 99, the rail-supported conveyance 47 is already deposited on the track installation 7 by its disk wheels 54 so that it rises from its support on the two longitudinal beams of the depositing box 99 and can be moved on the disk wheels 54.

LIST OF REFERENCE NUMERALS 1 sandwich construction
11 floor assembly
12 frame
13 base plate
14 container corner
15 intermediate space
16 deflection pulley
2 slide-out device
21 linear guides
21.1 outer hollow section
21.2 inner hollow section
22 linear drive
23 rail bridge
24 end plate
25 height adjustment means
3 (collapsible) ramp
31 foldable ramp portion
32 collapsible ramp portion
33 short support
34 long support
25 bending joint
36 coupling rod
α ramp angle
4 ISO container
41 floor surface
42 storage container
43 supply container
44 maintenance openings
45 (foldout) board wall
46 shutter
47 rail-supported conveyance
48 supply arrangement
5 transport vehicle
51 loading platform
52 buffer
53 lock element
54 disk wheel
55 coupling
6 rails
60 joist
61 track gauge adjustment means
62 swivelable rail portion
63 swivel bearing
64 rail extension
64.1 short rail extension
64.2 long rail extension
65 folding joint
66 gauge rod
67 lug
68 U-section
67 stop
7 track installation
8 telescopic boom
9 long sandwich construction
91 supporting framework
92 horizontal frame
93 vertical frame
94 L-section
95 toothed rack
96 drive motor
97 U-section rails
98 parallelogram
99 depositing box

What is claimed is:

1. A transporting and loading system for rail-supported conveyances using transport vehicles outfitted with a loading platform based on standardized ISO container dimensions and with standardized lock elements, the system comprising:

at least one rectangular frame in the form of a floor assembly conforming to the ISO container dimensions having two long sides, two short sides and four ISO container corners;

a loading and offloading unit allowing goods to be loaded past at least one short side of the at least one rectangular frame;

a sandwich construction comprising in a mirror-inverted manner at least two floor assemblies conforming to the ISO container dimensions, the at least two floor assemblies each comprising one rectangular frame and a base plate are rigidly connected via the container corners pairwise arranged one directly above the other;

an intermediate space provided between the at least two floor assemblies of the sandwich construction, for disposing drive units, transmission units and control units for an automated movement of the loading and offloading unit; and rails for holding and guiding the rail-supported conveyances on an upper base plate of the sandwich construction in a longitudinal direction of the at least one rectangular frame, the rails being aligned parallel to one another.

2. The transporting and loading system according to claim 1, wherein the loading and offloading unit is formed as a linear slide-out device arranged in the intermediate space between the at least two floor assemblies and wherein the linear slide-out device comprises:

at least two linear guides capable of moving out telescopically parallel to the long sides of the at least one rectangular frame;

at least one linear drive arranged symmetrically and parallel to the at least two linear guides, and a supporting structure comprising the upper base plate of the sandwich construction and an end plate closing the slide-out device which is formed on at least one of the short sides of the at least two floor assemblies of the sandwich construction.

3. The transporting and loading system according to claim 2, wherein the slide-out device comprises four linear guides and two linear drives, wherein the two linear drives are arranged in each instance between two linear guides which are arranged in pairs.

4. The transporting and loading system according to claim 2, further comprising a bridge element for bridging an open area formed when the slide-out device is moved out from the intermediate space of the sandwich construction and for lengthening at least the rails as a guide for rail-supported conveyances, the bridge element being fixably arranged at the supporting structure formed of the base plate and the end plate.

5. The transporting and loading system according to claim 2, further comprising a collapsible ramp having a foldable ramp portion and a collapsible ramp portion being additionally fastened to the end plate of the slide-out device, the collapsible ramp being capable of folding out as an incline for bridging a difference in height between the upper base plate of the sandwich construction and a ground level on which the transport vehicle conveying the sandwich construction stands in such a way that the rail-supported conveyances can be rolled on and off.

6. The transporting and loading system according to claim 5, wherein the collapsible ramp comprises a vertically movable height adjustment means disposed at the end plate of the slide-out device such that a connection level of the collapsible ramp corresponding to the upper base plate of the sandwich construction can be adapted to the level of an inner floor surface of an ISO container placed on the sandwich construction.

7. The transporting and loading system according to claim 5, wherein the collapsible ramp comprises two separate track portions being aligned in parallel, outfitted with rails, and movable synchronously with one another.

8. The transporting and loading system according to claim 7, wherein swivel bearings for swivelable rail portions are arranged at an upper end of the collapsible ramp portion of the collapsible ramp, wherein the swivel bearings are arranged medially at the parallel track portions of the collapsible ramp portion, so that the rail portions are swivelable laterally over a surface of the collapsible ramp portion and, when the ramp is folded out, form rail ends that can be adapted to a curved rail track.

9. The transporting and loading system according to claim 8, wherein the swivelable rail portions comprise rail extensions which can be folded out by a folding joint in a plane perpendicular to the track installation.

10. The transporting and loading system according to claim 9, wherein the rail extensions have ends which lie directly on the track installation and which are provided with means for guiding the rail extensions and the swivelable rail portions at the rails of the track installation.

11. The transporting and loading system according to claim 5, wherein the collapsible ramp comprises foldout supports on at least one respective end of the foldable ramp portion and collapsible ramp portion.

12. The transporting and loading system according to claim 1, further comprising a telescopic boom arranged as the loading and offloading unit on the upper base plate of the sandwich construction, wherein the telescopic boom comprises two telescopic arms and linear drives respectively arranged in parallel at the long sides of the rectangular frame of the sandwich construction.

13. The transporting and loading system according to claim 12, wherein at least an upper portion of the at least two floor assemblies of the sandwich construction is bearing-mounted so as to be rotatable around a perpendicular axis of rotation, wherein the rotatable upper portion of the at least two floor assemblies comprises the telescopic boom provided as the loading and offloading unit.

14. The transporting and loading system according to claim 1, wherein the loading and offloading unit comprises a supporting framework being longitudinally movably arranged on the upper base plate of the sandwich construction, the supporting framework being movable along the long sides of the sandwich construction in guide profiles over an entire length of the sandwich construction.

15. The transporting and loading system according to claim 14, wherein a parallelogram arrangement of linear drives connected to a depositing box for receiving the rail-supported conveyance is movably arranged at the supporting framework such that a movement to load and offload the depositing box comprises a horizontal loading and offloading step and a vertical loading and offloading step.

16. The transporting and loading system according to claim 1, wherein the loading platform being provided with three ISO container spaces, wherein the sandwich construction being arranged at a rear end of the loading platform, a first ISO container modified for receiving the rail-supported conveyances being arranged in the middle, and a second ISO container modified for supplying of the sandwich construction being arranged at a front end of the loading platform.

17. The transporting and loading system according to claim 1, wherein the loading platform being provided with two ISO container spaces, the sandwich construction being placed at a rear end of the loading platform, a first ISO container modified for receiving the rail-supported conveyances being placed on the sandwich construction, and a second ISO container modified for supplying of the sandwich construction is arranged in front of the sandwich construction on the loading platform.

* * * * *